US008930482B2

(12) United States Patent
Krugman et al.

(10) Patent No.: US 8,930,482 B2
(45) Date of Patent: Jan. 6, 2015

(54) COMMUNICATION EXCHANGES AND METHODS OF USE THEREOF

(71) Applicant: Broadridge Fluent Solutions, LLC, Lake Success, NY (US)

(72) Inventors: Robert Krugman, Edgewood, NY (US); Doug DeSchutter, Edgewood, NY (US); Martin Cottreau, Edgewood, NY (US)

(73) Assignee: Broadridge Fluent Solutions, LLC, Lake Success, NY (US)

(*) Notice: Subject to any disclaimer, the term of this patent is extended or adjusted under 35 U.S.C. 154(b) by 0 days.

(21) Appl. No.: 14/217,054

(22) Filed: Mar. 17, 2014

(65) Prior Publication Data

US 2014/0280651 A1    Sep. 18, 2014

Related U.S. Application Data

(60) Provisional application No. 61/800,479, filed on Mar. 15, 2013.

(51) Int. Cl.
*G06F 15/16*  (2006.01)
*H04L 12/58*  (2006.01)

(52) U.S. Cl.
CPC ................................ *H04L 51/00* (2013.01)
USPC ........................................................ 709/206

(58) Field of Classification Search
CPC ............................ G06Q 10/107; H04L 12/585
USPC ................................................ 709/204–207
See application file for complete search history.

(56) References Cited

U.S. PATENT DOCUMENTS

| | | | | |
|---|---|---|---|---|
| 7,769,815 | B2* | 8/2010 | Wang et al. | 709/206 |
| 8,224,903 | B1 | 7/2012 | Katz et al. | |
| 8,645,470 | B2* | 2/2014 | Trossen et al. | 709/206 |
| 2002/0174010 | A1 | 11/2002 | Rice, III | |
| 2002/0184444 | A1* | 12/2002 | Shandony | 711/118 |
| 2003/0191969 | A1* | 10/2003 | Katsikas | 713/201 |
| 2004/0122730 | A1 | 6/2004 | Tucciarone et al. | |
| 2005/0172033 | A1* | 8/2005 | Mathew et al. | 709/246 |
| 2009/0037548 | A1 | 2/2009 | Ordille et al. | |
| 2010/0325698 | A1 | 12/2010 | Ginter et al. | |
| 2011/0033050 | A1 | 2/2011 | Maller | |
| 2013/0254897 | A1 | 9/2013 | Reedy et al. | |
| 2014/0223573 | A1 | 8/2014 | Reedy et al. | |

OTHER PUBLICATIONS

International Search Report and Written Opinion from International Application No. PCT/US2014/030746 dated Sep. 5, 2014.

* cited by examiner

*Primary Examiner* — Chirag R Patel
(74) *Attorney, Agent, or Firm* — Greenberg Traurig, LLP

(57) ABSTRACT

In some embodiments, the instant invention provides for a computer-implemented method that includes the following steps: administering, by a first specifically programmed computer system of a communications exchange, an electronic delivery of a first electronic distribution from a first sender to a first recipient, where the mediating includes: receiving from a first source of a plurality of sources, a first electronic distribution of the first sender, receiving from the first sender, a plurality of sender attributes of the first sender and a plurality of sender rules of the first sender that define how electronic distributions of the first sender to be delivered; receiving the plurality of recipient attributes of the first recipient and the plurality of recipient rules of the first recipient; matching the first electronic distribution of first sender to the first recipient; transmitting, the first electronic distribution of first sender to first channel of the first recipient.

21 Claims, 24 Drawing Sheets

COMMUNICATION EXCHANGES AND METHODS OF USE THEREOF

RELATED APPLICATIONS

This application claims the priority of U.S. provisional application Ser. No. 61/800,479, entitled "COMPUTER METHOD AND COMPUTER SYSTEM FOR COMMUNICATION EXCHANGE," filed Mar. 15, 2013, which is incorporated herein by reference in its entirety for all purposes.

TECHNICAL FIELD

In some embodiments, the instant invention is related to communication exchanges that allow to electronically mediate, route, and/or deliver electronic information (e.g., discrete data (e.g., files), streaming data, electronic messages, etc.) from one or more senders to one or more recipients based on specifically programmed rule engines/interfaces/communication protocols that define at least one of: relationships between senders and recipients, formats of the electronic information, sending rules, delivery rules, characteristics of communication passageways/channels, and other suitable variables.

BACKGROUND OF INVENTION

In some instances, the importance of electronic communication in all aspects of society is well known. Typically, the use of electronic communications has become woven into the way individuals communicate and otherwise provide information to each other. Typically, individuals utilize myriad electronic communication platforms and types of electronic information (e.g., discrete data (e.g., files), streaming data, electronic messages, etc.) to communicate among themselves.

BRIEF SUMMARY OF INVENTION

In some embodiments, the instant invention provides a specifically programmed system for controlling that includes at least the following components: at least one specialized computer machine, including at least: a non-transient memory having at least one region for storing particular computer executable program code; and at least one processor for executing the particular program code stored in the memory, where the particular program code is configured so that the at least one specialize computer machine is configured to at least perform the following operations:

In some embodiments, the instant invention provides for a computer-implemented method that at least includes the following steps: administering, by a first specifically programmed computer system of a communications exchange, an electronic delivery of at least one first electronic distribution from at least one first sender to at least one first recipient, by allowing: i) the at least one first sender to send the at least one first electronic distribution to the at least one first recipient, and ii) the at least one first recipient to set a plurality of recipient attributes and a plurality of recipient rules to identify, for the at least one first sender, the communications exchange, or both, at least one of the following: 1) what electronic distributions the at least one first recipient desires to receive, 2) where the at least one first recipient desires to receive electronic distributions addressed to the at least one first recipient, and 3) how the at least one first recipient desires to receive the electronic distributions addressed to the at least one first recipient; where the mediating, by the first specifically programmed computer system of the communications exchange, includes: receiving, by the first specifically programmed computer system of a communications exchange, from at least one first source of a plurality of sources, at least one first electronic distribution of the at least one first sender, where the at least one first electronic distribution is addressed to the at least one first recipient; where the at least one first source is a second computer-programmed electronic system that the at least one first sender utilizes; where the receiving of the at least one first electronic distribution is in accordance with at least one first electronic exchange protocol defined between the first specifically programmed computer system of the communications exchange and the second computer-programmed electronic system of the at least one first source; receiving, by the first specifically programmed computer system, from the at least one first sender, a plurality of sender attributes of the at least one first sender and a plurality of sender rules of the at least one first sender that define how electronic distributions of the at least one first sender to be delivered; receiving, by the first specifically programmed computer system of the communications exchange, the plurality of recipient attributes of the at least one first recipient and the plurality of recipient rules of the at least one first recipient; matching, by the first specifically programmed computer system of the communications exchange, the at least one first electronic distribution of at least one first sender to the at least one first recipient; transmitting, by the first specifically programmed computer system of the communications exchange, the at least one first electronic distribution of at least one first sender to at least one first channel associated with the at least one first recipient; where the matching and transmitting are based at least in part on: i) the plurality of sender attributes of the at least one first sender, ii) the plurality of sender rules of the at least one first sender, iii) the plurality of recipient attributes of the at least one first recipient, and iv) the plurality of recipient rules of the at least one first recipient; where the first channel is a third computer-programmed electronic system that the at least one first recipient utilizes to receive the electronic distributions addressed to the at least one first recipient; where the second computer-programmed electronic system of the at least one first source and the third computer-programmed electronic system of the at least one first channel are independent from each other; and where the transmitting is in accordance with at least one second electronic exchange protocol defined between the first specifically programmed computer system of the communications exchange and the third computer-programmed electronic system of the at least one channel.

In some embodiments, the at least one first electronic exchange protocol is based at least in part on: i) a plurality of source attributes of the at least one first source, ii) a plurality of source rules of the at least one first source, iii) a plurality of exchange attributes of the communications exchange, and iv) a plurality of exchange rules of the communications exchange.

In some embodiments, the at least one second electronic exchange protocol is based at least in part on: i) a plurality of channel attributes of the at least one first channel, ii) a plurality of channel rules of the at least one first channel, iii) a plurality of exchange attributes of the communications exchange, and iv) a plurality of exchange rules of the communications exchange.

In some embodiments, the at least one first channel is selected from the group of: i) secure electronic messaging system, ii) a website, iii) a device application, and iv) a digital mail system.

In some embodiments, the at least one first source is selected from the group of: i) secure electronic messaging system, ii) a website, iii) a device application, and iv) a digital mail system.

In some embodiments, the at least one first recipient is selected from the group of: i) an individual, ii) a retail investor, iii) an institutional investor, and iv) an entity that is not a person.

In some embodiments, the plurality of recipient attributes are selected from the group of: i) a piece of information to be used to verify identity of the at least first recipient, where the piece of information includes at least one of the following: 1) first, last and middle name, 2) an organization name, 3) a physical address, 4) a date of birth, 5) a government identifier, 6) a telephone number, and 7) a bio-metrics credential, ii) an email address, and iii) an identity credential.

In some embodiments, the plurality of recipient rules are selected from the group of: i) at least one legal consent rule regarding obtaining a legal consent to deliver regulatory information, ii) at least one first channel rule set by sender, iii) at least one second channel rule regarding document type, and iv) at least one third channel rule regarding delivery time, where the plurality of recipient rules are set to be permanent or to be followed during or for a pre-determined time period.

In some embodiments, the at least one first sender is selected from the group of: i) an individual, ii) an individual investor, iii) a financial organization, and iv) an entity that is not a person.

In some embodiments, the plurality of sender attributes are selected from the group of: i) a piece of information to be used to verify identity of the at least first recipient, where the piece of information includes at least one of the following: 1) first, last and middle name, 2) an organization name, 3) a physical address, 4) a date of birth, 5) a government identifier, 6) a telephone number of the at least one first recipient, 7) a telephone number of the organization, and 8) a bio-metrics credential, ii) identifying information of the at least one first sender to be displayed by the at least one first channel to the at least one recipient, iii) at least one first sender identifier that is utilized to identify the at least one first sender to at least one of: the first specifically programmed computer system of the communications exchange, the at least one first source, the plural of the sources, the at least one first channel, the plurality of channels, and the at least one first recipient.

In some embodiments, the plurality of sender rules is selected from the group of: i) at least one first sender rule identifying at least one channel supported by the at least one sender, ii) at least one second sender rule identifying at least one characteristic to be used to identify the at least one channel supported by the at least one sender, iii) at least one fourth sender rule identifying a legal consent language to be accepted by to the at least one first recipient, iv) at least one fourth sender rule identifying how identity of the at least one first recipient to be verified, and v) at least one fourth sender rule identifying how the plurality of recipient attributes of the at least one first recipient to be validated.

In some embodiments, the at least one first electronic distribution of the at least one first sender is selected from the group of: i) at least one advertising, ii) at least one catalogue, iii) at least one financial record statement, iv) at least one trade confirmation, v) at least one regulatory communication, vi) a public company's proxy, voting instruction form, or both, vii) a mutual fund's proxy, voting instruction form, or both, viii) at least one initial public offering prospectus, ix) at least one mutual fund prospectus, x) at least one legal notice, xi) at least one corporate notice, xii) at least one government non-regulatory communication, xiii) at least one certificate, xiv) at least one trading instruction, xv) at least one check, xvi) at least one data element, xvii) at least one image, xviii) at least one video, xix) at least one audio recording, xx) at least one interactive application, xxi) at least one letter or notice, xxii) at least one standardized formatted message, xxiii) at least one non-standard formatted message whose formatted has been mutually agreed upon the at least one first sender and the at least one first recipient); and xxiv) at least one link to at least one of: the at least one electronic document, the at least one data element, the at least one image, the at least one video, the at least one audio recording, and the at least one interactive application.

In some embodiments, the method further includes at least one of the following: i) sharing, by the first specifically programmed computer system of a communications exchange, the plurality of recipient attributes and the plurality of the recipients rules with the at least one first sender, at least one other sender of the plurality of senders, or the plurality of senders, ii) applying, by the first specifically programmed computer system of a communications exchange, the plurality of recipient attributes and the plurality of the recipients rules to deliver the at least one first electronic distribution received from the at least one first sender, without prior sharing the plurality of recipient attributes and the plurality of the recipients rules with the at least one first sender and the at least one first source, and iii) applying, by the first specifically programmed computer system of a communications exchange, the plurality of recipient attributes and the plurality of the recipients rules to deliver the at least one first electronic distribution received from the at least one first sender.

In some embodiments, the first specifically programmed computer system of the communications exchange receives the plurality of recipient attributes and the plurality of recipient rules from at least one of the following: i) the at least one first sender, at least one other sender of the plurality of senders, or the plurality of senders, and ii) the at least one first channel, at least one other channel of the plurality of channels, or the plurality of channels.

In some embodiments, the plurality of sender attributes and the plurality of sender rules are set by at least one of the following: i) the at least one first sender, and ii) the at least one first source, at least one other source of the plurality of sources, or the plurality of sources.

In some embodiments, the method further includes: notifying, by the first specifically programmed computer system of the communications exchange, the at least one first sender that the delivery of the at least one first electronic distribution has failed.

In some embodiments, the method further includes: identifying, by the first specifically programmed computer system of the communications exchange, at least one relationship between the at least one first recipient and the at least one first sender, the plurality of senders, or both, based at least in part on the plurality of recipient attributes set by the at least one first recipient.

In some embodiments, the identifying the at least one relationship is further based on historical information about at least one of: i) the at least one first recipient, ii) the at least one first sender, and iii) the plurality of senders.

In some embodiments, the method further includes: converting, by the first specifically programmed computer system of the communications exchange, the at least one first electronic distribution from a first format of the at least one first source to a second format of the at least one first channel.

In some embodiments, the method further includes: generating, by the first specifically programmed computer system of the communications exchange, for the at least one first sender, at lest one first report, identifying at least one of the following: i) delivery information about successful delivery, failed delivery, or both, ii) viewing information regarding whether has been viewed or not, and iii) usage information regarding a utilization of the at least one first electronic distribution within the at least one first channel, the plurality f channels, or both.

In some embodiments, the method further includes: generating, by the first specifically programmed computer system of the communications exchange, at least one usage report for at least one of: i) the at least one first source, ii) the at least one first sender, iii) the at least one first recipient, and iv) the at least one first channel.

In some embodiments, the plurality of channel rules includes at least two of the following: i) at least one first channel rule identifying at least one source supported by the at least one first channel, ii) at least one second channel rule identifying at least one sender supported by the at least one first channel, iii) at least one third channel rule identifying at least one distribution type supported by the at least one first channel, iv) at least one fourth channel rule identifying at least one distribution format supported by the at least one first channel, v) at least one fifth channel rule identifying at least one unassociated attribute supported by the at least one first channel, and vi) at least one sixth channel rule identifying at least one unassociated rule supported by the at least one first channel.

In some embodiments, the instant invention provides for a specifically programmed communications exchange, including at least the following components: at least one first specialized computer machine, including: a non-transient memory having at least one region for storing particular computer executable program code; and at least one processor for executing the particular program code stored in the memory, where the particular program code is configured so that the at least one first specialize computer machine is configured to at least perform the following operations: administering an electronic delivery of at least one first electronic distribution from at least one first sender to at least one first recipient, by allowing: i) the at least one first sender to send the at least one first electronic distribution to the at least one first recipient without knowing an electronic address associated with the at least one first recipient, and ii) the at least one first recipient to set a plurality of recipient attributes and a plurality of recipient rules to identify, for the at least one first sender, the communications exchange, or both, at least one of the following: 1) what electronic distributions the at least one first recipient desires to receive, 2) where the at least one first recipient desires to receive electronic distributions addressed to the at least one first recipient, and 3) how the at least one first recipient desires to receive the electronic distributions addressed to the at least one first recipient; where the mediating includes: receiving, from at least one first source of a plurality of sources, at least one first electronic distribution of the at least one first sender, where the at least one first electronic distribution is addressed to the at least one first recipient; where the at least one first source is a second computer-programmed electronic system that the at least one first sender utilizes; where the receiving of the at least one first electronic distribution is in accordance with at least one first electronic exchange protocol defined between the communications exchange and the second computer-programmed electronic system of the at least one first source; receiving, from the at least one first sender, a plurality of sender attributes of the at least one first sender and a plurality of sender rules of the at least one first sender that define how electronic distributions of the at least one first sender to be delivered; receiving, the plurality of recipient attributes of the at least one first recipient and the plurality of recipient rules of the at least one first recipient; matching the at least one first electronic distribution of at least one first sender to the at least one first recipient; transmitting the at least one first electronic distribution of at least one first sender to at least one first channel associated with the at least one first recipient; where the matching and transmitting are based at least in part on: i) the plurality of sender attributes of the at least one first sender, ii) the plurality of sender rules of the at least one first sender, iii) the plurality of recipient attributes of the at least one first recipient, and iv) the plurality of recipient rules of the at least one first recipient; where the first channel is a third computer-programmed electronic system that the at least one first recipient utilizes to receive the electronic distributions addressed to the at least one first recipient; where the second computer-programmed electronic system of the at least one first source and the third computer-programmed electronic system of the at least one first channel are independent from each other; and where the transmitting is in accordance with at least one second electronic exchange protocol defined between the first specifically programmed computer system of the communications exchange and the third computer-programmed electronic system of the at least one channel.

BRIEF DESCRIPTION OF THE FIGURES

The present invention can be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

Figure 1:
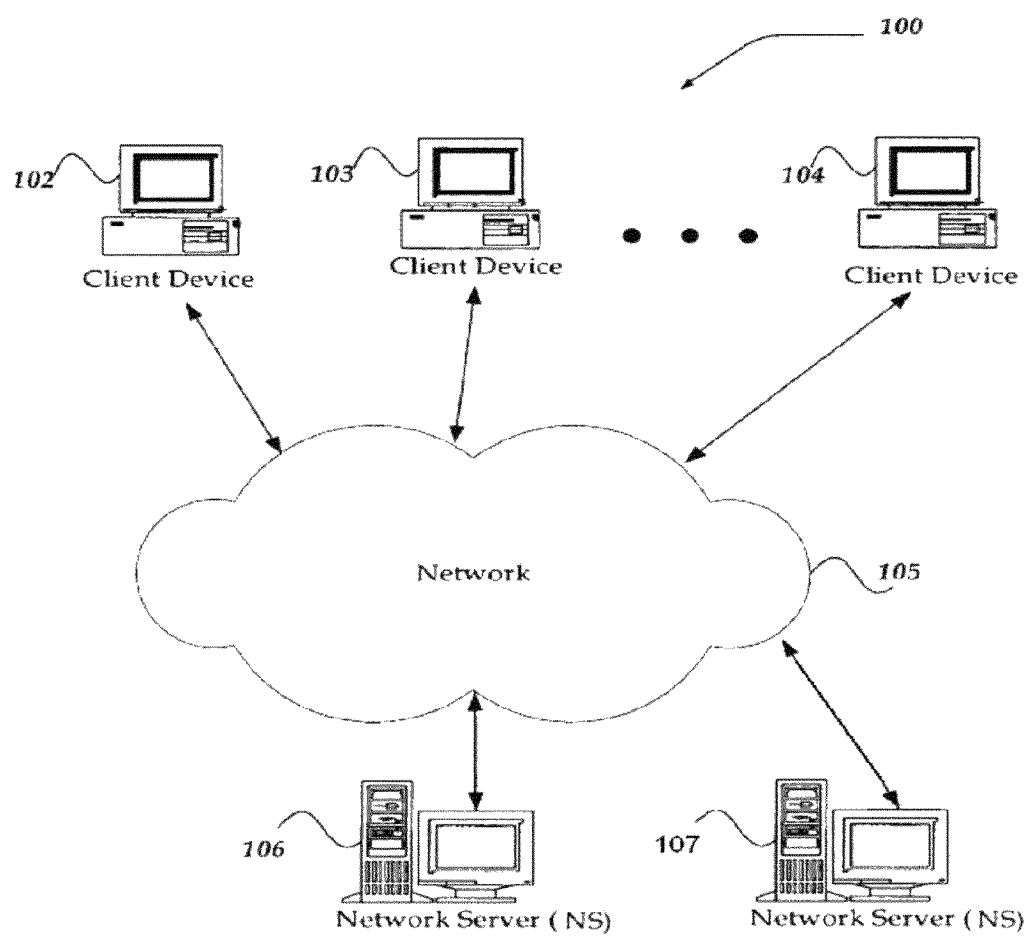
FIGS. 1-4 are illustrative computer system architectures representative of some embodiments of the present invention.

In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

DETAILED DESCRIPTION OF INVENTION

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive. Any alterations and further modifications of the inventive feature illustrated herein, and any additional applications of the principles of the invention as illustrated herein, which can normally occur to one skilled in the relevant art and having possession of this disclosure, are to be considered within the scope of the invention.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action can occur instantaneously or almost instantaneously in time when another event/action has occurred.

As used herein, the term "dynamic(ly)" is directed to an event/action that can occur without any human intervention. In some embodiments, the dynamic event/action may be in real-time, hourly, daily, weekly, monthly, etc.

In some embodiments, the terms "sender" and "senders," as referenced herein, are directed to entity(ies), individual(s), and/or electronic device(s) that need to send electronic information (e.g., discrete data (e.g., files), streaming data, electronic messages, etc.) to one or more recipients that may be known and/or unknown to the sender(s). In some embodiments, there are at least 10,000 senders. In some embodiments, there are at least 1,000 senders. In some embodiments, there are at least 100,000 senders. In some embodiments, there are at least 1,000,000 senders.

In some embodiments, the terms "recipient" and "recipients," as referenced herein, are directed to entity(ies), individual(s), and/or electronic device(s) who receives the electronic information (e.g., discrete data (e.g., files), streaming data, electronic messages, etc.) from the sender(s) that may be known and/or unknown to the recipient(s). In some embodiments, there are at least 10,000 recipients. In some embodiments, there are at least 1,000 recipients. In some embodiments, there are at least 100,000 recipients. In some embodiments, there are at least 1,000,000 recipients.

For purposes of this description, the terms "sender(s)" and "recipient(s)" are used to describe various communication methodologies of the instant invention and are not intended to uniquely designated a particular individual and a particular entity as being only the sender or the recipient. Consequently, for purposes of this description, the particular individual and the particular entity can be the sender and the recipient based on the specific function(s) the particular individual and the particular entity perform in accordance with the communication methodologies of the instant invention.

In some embodiments, the terms "source(s)" and "source system(s)," as referenced herein, are directed to specifically programmed system(s)/platform(s) that at least transmit(s) the electronic information (e.g., discrete data (e.g., files), streaming data, electronic messages, etc.) on behalf of and/or from the sender(s). In some embodiments, there are at least 10 sources. In some embodiments, there are at least between 2 and 100 sources. In some embodiments, there are at least between 10 and 1,000 sources. In some embodiments, there are at least 1,000 sources.

In some embodiments, the terms "channel(s)" and "channel system(s)," as referenced herein, are directed to specifically programmed system(s)/platform(s) that at least receive the electronic information (e.g., discrete data (e.g., files), streaming data, electronic messages, etc.) on behalf of the recipient(s). In some embodiments, the channel(s) can also process the received electronic information to present such electronic information to the recipient(s), and/or their designees, base, at least in part, on one or more rules set by the recipient(s), and/or their designees, and/or determined, by the channel(s), for the recipient(s), and/or their designees. In some embodiments, there are at least 10 channels. In some embodiments, there are at least between 2 and 100 channels. In some embodiments, there are at least between 10 and 1,000 channels. In some embodiments, there are at least 1,000 channels.

For purposes of this description, the terms "source(s)," "source system(s)," "channel(s)", and "channel system(s)" are used to describe various communication methodologies of the instant invention and are not intended to uniquely designated a particular entity and a particular programmed system as being only the source/source system or the channel/channel system. Consequently, for purposes of this description, the particular entity and the particular programmed system can be the source/source system and the channel/channel system based on the specific functions(s) that the particular entity and the particular programmed system perform in accordance with the communication methodologies of the instant invention.

In some embodiments, the terms "rule" and "rules," as referenced herein, are directed to relationships and/or interactions between senders, sources, recipients, and/or channels. In some embodiments, rules take the form of one or more processing rules, one or more characteristics, and/or one or more attribute of an entity or system. For example, various aspects of the instant invention include channel rules that are directed to rules concerning the channels. Also, various aspects of the instant invention include source rules that are directed to rules concerning the sources. Also, various aspects of the instant invention include sender rules that are directed to rules concerning the senders. In addition, various aspects of the instant invention include recipient rules that are directed to rules concerning the recipients.

In some embodiments, the specifically programmed system(s)/platform(s) of the instant invention incorporate at least 10 rules. In some embodiments, specifically programmed system(s)/platform(s) of the instant invention incorporate at least 100 rules. In some embodiments, specifically programmed system(s)/platform(s) of the instant invention incorporate at least 1000 rules. In some embodiments, specifically programmed system(s)/platform(s) of the instant invention incorporate at least 10,000 rules.

In some embodiments, the terms "recipient rule" and "recipient rules," as referenced herein, are directed to rules that define/identify characteristics of set by the recipients about themselves and/or the recipients' rules in regards to channels, distribution types and/or the senders.

In some embodiments, the terms "sender rule" and "sender rules," as referenced herein, are directed to rules that define/identify which channel rules the senders require to be supported and the recipient rules the senders are willing to support.

In some embodiments, the terms "recipient rule" and "recipient rules," as referenced herein, are directed to rules that define/identify characteristics of set by the recipients about themselves and/or the recipients' rules in regards to channels, distribution types and/or the senders.

In some embodiments, the terms "distribution" and "distributions," as referenced herein, are directed to a piece of information or data that needs to be electronically sent/transmitted. In some embodiments, the distributions are characterized/classified based, at least in part, on one or more of the following distribution types, but are not limited to: communications, rules, data, transactional messages, and etc.

In some embodiments, the specifically programmed system(s)/platform(s) of the instant invention allow to minimize complexity and/or costs associated with integrating new sources by senders.

In some embodiments, the specifically programmed system(s)/platform(s) of the instant invention form at least one electronic communication exchange mediating network(s) of the senders, the recipients, the sources and the channels (the mediated exchange model). In some embodiments, an illustrative electronic communications exchange of the instant invention is an integrated network of the senders, the recipients, the sources and the channels that allows for the delivery of information based upon rules defined by the recipient(s) and supported channel(s) defined by the sender(s). In some embodiments, the illustrative electronic communications exchange of the instant invention (also referenced herein as "the exchange") allows the senders to send distributions to the recipients without having prior knowledge to where to send the distribution to, and the recipients can set rules that alert the senders and the exchange to information about themselves (the recipients), including, but is not limited to, where the recipients would like to receive distributions, and the structure of those distributions.

In some embodiments, the exchange allows the senders to send distributions to the recipients when the senders know an electronic address of a recipient and the exchange is specifically programmed in accordance with the instant invention to determine that such address is no longer valid. In cases of invalid addresses, in some embodiments, the exchange can alert the senders and/or respective channels about the invalid address and/or automatically identify the new address for the intended recipient and re-route the distribution accordingly.

For example, the exchange of the instant invention can be utilized for at least one of the following applications:
 i) Use Case 1 —Distribution of Mail to an individual/entity;
 ii) Use Case 2 —Standing Instructions on how to vote on corporate actions/issues; and
 iii) Use Case 3 —Distribution of Data to an institution (e.g., brokerage, institutional shareholder, etc.).

In some embodiments, the exchange of the instant invention ensures that the channels agree to the set of rules that the sender(s) has/have required.

In some embodiments, an illustrative electronic communications exchange of the instant invention allows for the delivery of distributions based, at least in part, upon rules defined by the recipient(s) and/or the sender(s) and supported by the channel(s) and/or source(s).

In some embodiments, the illustrative electronic communications exchange of the instant invention allows the senders to send distributions to the recipients without having a prior knowledge as to where to send the distribution. In some embodiments, the illustrative electronic communications exchange of the instant invention allows the senders to send distributions to the recipients without having a prior knowledge as to where to send the distribution and while ensuring compliance with the rules set/defined by sources, channels, and/or the recipients.

In some embodiments, the illustrative electronic communications exchange of the instant invention allows the recipients to select/define the channels they prefer and/or set/select rules and/or attributes that alert/inform the illustrative electronic communications exchange of the instant invention to information/data about the recipients, including, but not limited to, what channels the recipients would like to receive the distributions through.

In some embodiments, the illustrative electronic communications exchange of the instant invention is content agnostic, meaning that header information is defined/set ensuring that the information can be delivered to intended recipients but the distributions can be of any format and/or structure. In some embodiments, the illustrative electronic communications exchange of the instant invention mediates the distributions by ensuring that the rules, which are set/selected/defined by the recipients, channels, sources, and/or senders are being followed (e.g., enforced) and that all parties have agreed to set(s) of obligations (e.g., contractual obligations) to adhere to the rules.

Figure 5:
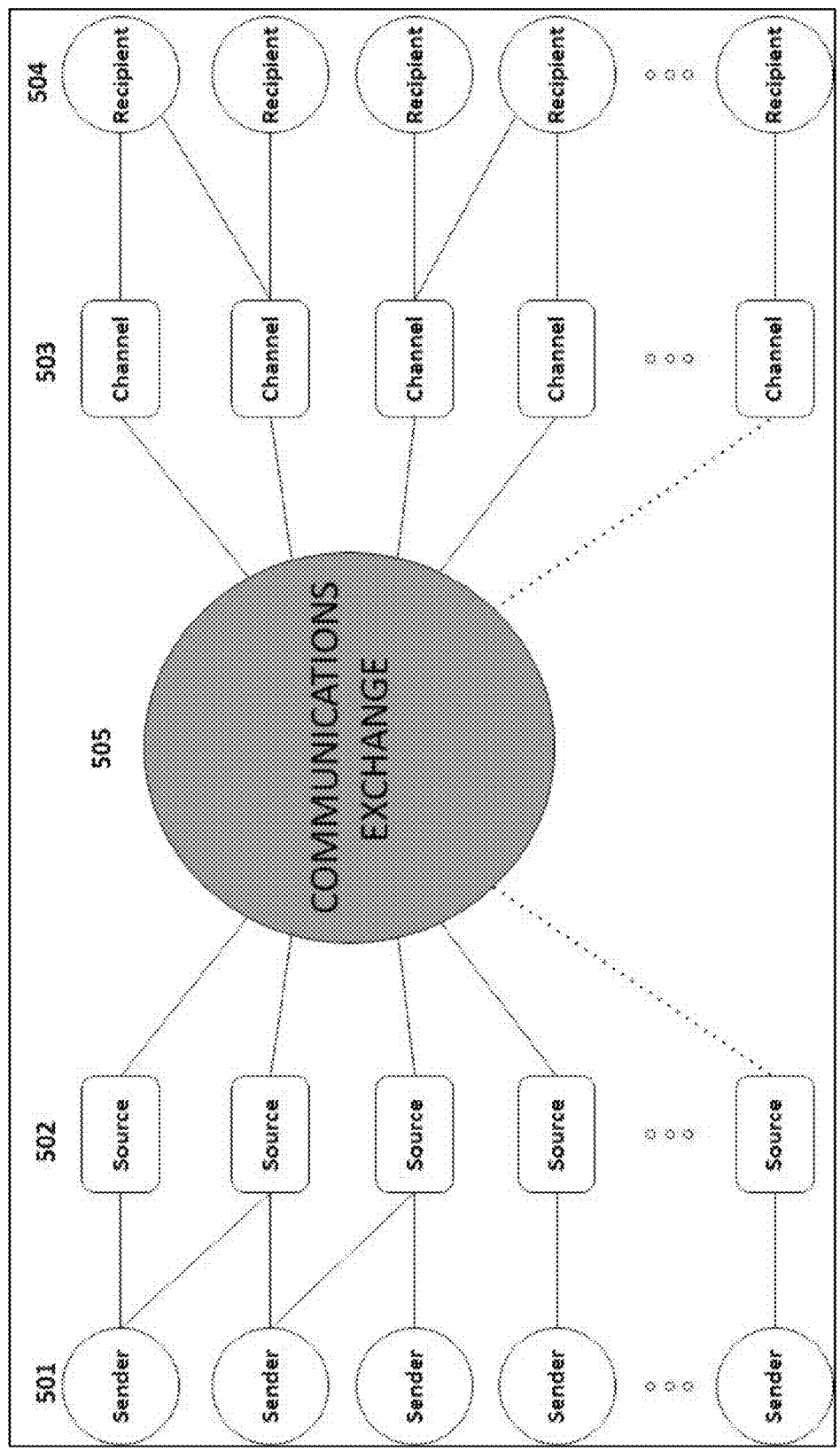
FIGS. 5-24 are flowcharts representative of some embodiments of the present invention.

FIG. 5 illustrates an exemplary arrangement of the illustrative electronic communications exchange of the instant invention, showing various type of on-way and/or two-way relationships between the senders (501), the sources (502), the channels (503), and/or the recipients (504) (e.g., one-to-one, one-to-many, many-to-many) that the an exemplary arrangement of the illustrative electronic communications exchange (505) can mediate. FIG. 5, for example, illustrates that, in some embodiments, the illustrative electronic communications exchange of the instant invention minimizes/reduces the complexity, by pushing the distributions and allowing the existing/future channels to receive the distributions for a host of the senders and/or the recipients.

Figure 6:
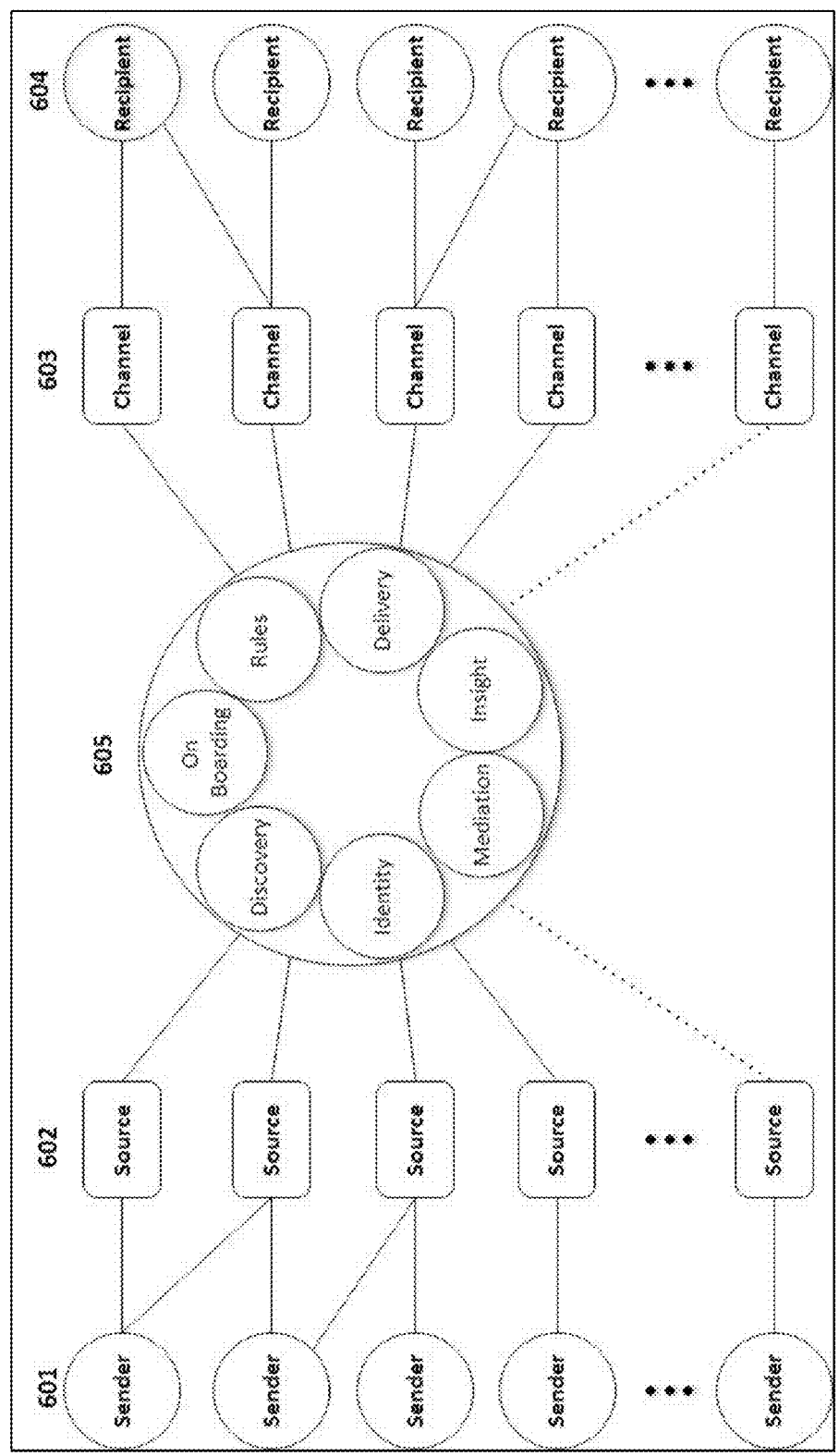

FIG. 6 illustrates an exemplary arrangement of the illustrative electronic communications exchange of the instant invention, showing various type of on-way and/or two-way relationships between the senders (601), the sources (602), the channels (603), and/or the recipients (604) (e.g., one-to-one, one-to-many, many-to-many) that the an exemplary arrangement of the illustrative electronic communications exchange (605) can mediate. FIG. 6, for example, illustrates that, in some embodiments, the illustrative electronic communications exchange of the instant invention minimizes/reduces the complexity, by pushing the distributions and allowing the existing/future channels to receive the distributions for a host of the senders and/or the recipients.

As shown in FIG. 6, in some embodiments, the illustrative electronic communications exchange of the instant invention can perform at least one or more of the following primary exchange functions:
 On Boarding;
 Rules;
 Discovery;
 Delivery;
 Insight;
 Mediation; and
 Identity.

In some embodiments, regarding the "On Boarding" function, each of the senders, each of the sources, each of the recipients, and/or each of the channels can have and/or have to meet one or more onboarding requirements/conditions. In some embodiments, the illustrative electronic communications exchange of the instant invention captures the relevant information and ensures that parties are agreeing to predetermined set(s) of arrangements (e.g., legal contracts, highlighting the rules and/or obligations of being part of the illustrative electronic communications exchange of the instant invention.)

In some embodiments, the "Rules" functionality identifies numerous processes by which the illustrative electronic communications exchange of the instant invention captures, applies, distributes and/or maintains the sender rules, the recipient rules, the source rules, and/or the channel rules.

In some embodiments, the "Discovery" functionality identifies numerous processes by which the illustrative electronic communications exchange of the instant invention identifies relationships between the senders and the recipients, enabling the flow of information. In some embodiments, the relationship(s) between the senders and the recipients are/is not expressly defined/determined and the illustrative electronic communications exchange of the instant invention dynamically determines/identifies those relationships instead.

In some embodiments, the "Delivery" functionality identifies numerous processes by which the illustrative electronic communications exchange of the instant invention delivers the distribution(s) from the sender(s) to the recipient(s) based, at least in part, upon defined (e.g., defined/selected/set by the exchange, the sender(s), the source(s), the recipient(s), and/or channel(s)) rules, etc.

In some embodiments, the "Insight" functionality identifies numerous processes by which the illustrative electronic communications exchange of the instant invention allows the audit trail of activities and/or the reporting that can be developed.

In some embodiments, the "Mediation" functionality identifies numerous processes by which the illustrative electronic communications exchange of the instant invention ensures that the situationally appropriate application of rules defined by the senders and/or the recipients are being applied during interactions between the sources and the channels (e.g., matching rules of the senders and the recipients, and then distributing the distributions accordingly).

In some embodiments, the "Identity" functionality identifies numerous processes by which the illustrative electronic communications exchange of the instant invention ensures that both the sources and the channels are properly validating the identity of the senders and the recipients to the agreed upon level of identity proofing.

In some embodiments, each source and channel performs one or more of the following primary functions:
  Publishing,
  Storage,
  Mediation,
  Identity,
  Present, and
  Audit.

In some embodiments, the "Publishing" functionality identifies numerous processes by which illustrative sources utilize application programming interfaces (APIs) and/or batch interfaces to publish information to the illustrative electronic communications exchange of the instant invention. In some embodiments, the physical integration between the illustrative source and the illustrative electronic communications exchange of the instant invention can occur on the backend, during composition and/or via a printing system.

In some embodiments, the "Storage" functionality identifies numerous processes by which illustrative sources can choose to point to one or more storage repositories of the underlying information (e.g., documents, messages, streaming content, etc.) and/or publish the information through the illustrative electronic communications exchange of the instant invention for storage within the illustrative electronic communications exchange of the instant invention and/or within an illustrative channel.

In some embodiments, the "Mediation" functionality identifies numerous processes by which illustrative sources obtain permission(s) to publish the sender content (e.g., information sent by the sender(s)) through the illustrative electronic communications exchange of the instant invention. In some embodiments, the illustrative sources are responsible for any errors in the sender content that they are providing.

In some embodiments, the "Identity" functionality identifies numerous processes by which illustrative channels ensure the validity of the recipients by performing necessary actions to validate the recipients' identity.

In some embodiments, the "Present" functionality identifies numerous processes by which illustrative channels notify that new communication(s) have/has arrived and the interface by which the recipients are able to view/process the communication(s).

In some embodiments, the "Audit" functionality identifies numerous processes by which illustrative channels provide an interface for accessing audit trail(s)/log(s) by the illustrative electronic communications exchange of the instant invention so as to allow the sender(s) a complete audit trail of the delivery of communication(s).

Examples of Illustrative Methodologies Utilized for the "On Boarding"

In some embodiments, regarding the "On Boarding" function, each of the senders, each of the sources, each of the recipients, and/or each of the channels can have and/or have to meet one or more onboarding requirements/conditions. In some embodiments, the illustrative electronic communications exchange of the instant invention captures the relevant information and ensures that parties are agreeing to predetermined set(s) of arrangements (e.g., legal contracts, highlighting the rules and/or obligations of being part of the illustrative electronic communications exchange of the instant invention.)

In some embodiments, the senders onboard to the illustrative electronic communications exchange of the instant invention via source system(s) to be able to send their distributions to the recipients according to the senders' distribution rules. In some embodiments, the senders can also specify, to the illustrative electronic communications exchange of the instant inventions and/or their respective source(s), services which the senders would like to participate in.

In some embodiments, the source systems onboard to the illustrative electronic communications exchange of the instant invention to provide the distributions it generates/transmits, on behalf of one or more senders, to the illustrative electronic communications exchange of the instant invention.

In some embodiments, the channel systems onboard to the illustrative electronic communications exchange of the instant invention to receive/obtain the distributions, on behalf of the recipients, from the senders via the illustrative electronic communications exchange of the instant invention.

In some embodiments, the recipient onboard to the illustrative electronic communications exchange of the instant invention via the channel(s) to receive distributions from senders according to the recipients' rules.

Illustrative Examples of the Senders' On-Boarding

In some embodiments, the senders onboard to the illustrative electronic communications exchange of the instant invention via the source system(s) to be able to send their distributions to the recipients according to the senders' distribution rules. In some embodiments, the senders also specify/select/define services that they will participate in to the illustrative electronic communications exchange of the instant inventions. In some embodiments, during the onboarding process, the senders can perform at least one or more of the following activities, in one or more predetermined or non-predetermined order:

1) Agree to a Business Exchange Contract which can include, but not limited to, legal terms of the illustrative electronic communications exchange of the instant invention, rules and obligations of each sender and of the illustrative electronic communications exchange of the instant invention (also, referenced herein as "the exchange");

2) Define which services to use from the exchange which can include, but is not limited to, one or more of the following: Rule exchange, Discovery, Delivery, and/or Insight;

3) Define distribution rules (e.g., sender rules) which can include one or more conditions to be respected by the exchange and any channel in the delivery of the distributions to recipient(s) such as, but is not limited to, the rules needed from the recipient(s), how the recipient(s) are/is authenticated and/or identified, a level of security needed for the delivery, a storage of any distribution, support for dual distribution, etc.;

4) Define Sender's Identify which can include, but is not limited to, how particular sender(s) will be presented and identified to the channel(s) and/or other sender(s) on the exchange (e.g., but not limited to the sender's name, logo, contact information, and/or other information that may help particular recipient(s) to identify/recall the sender);

5) Define Sender's Distribution Types which can include the distribution types (e.g., —mail (e.g., MIME), streaming media, XML objects, FIX (Financial Information eXchange) data, FAST (FIX Adapted for Streaming) data, etc.) that particular sender(s) will be providing to the exchanges (via the source systems);

6) Provide historical information which can include, but is not limited to, previous distributions to the recipients, information about previous distributions, information about previous recipients to enable services of the exchange; and 7) Designate one or more sources which can include, but is not limited to, identifying the source system(s) that will be providing the distributions for and/or from particular sender(s).

In some embodiments, particular source(s) could be the sender(s) themselves/itself. In some embodiments, the instant invention can assume that relationship(s) exist(s) between the sender(s) and the source(s) separately from the particular sender's relationship with the exchange.

Illustrative Examples of the Sources' On-Boarding

In some embodiments, the sources onboard to the illustrative electronic communications exchange of the instant invention to provide the distributions the sources produce (on behalf of one or more senders) to the illustrative electronic communications exchange of the instant invention. In some embodiments, during the onboarding process, the sources can perform at least one or more of the following activities, in one or more predetermined or non-predetermined order:

1) Agree to a Business Exchange Contract which can include, but not limited to, the legal terms of the exchange, including rules and obligations of the source system(s) and of the exchange (in some embodiments, the instant invention assumes that there is a relationship between the senders and the source(s) separately from the relationship between i) the source(s) and/or the senders and ii) with the exchange);

2) Define the header format of Distributions which can include, but is not limited to, defining the data format for the header information of the distributions that will be sent via the exchange;

3) Define Security protocols which can include, but is not limited to, defining the security protocols for the transmission of data between the source system(s) and the exchange, including (but is not limited to) authentication, identification, and/or encryption for both data and transport mechanisms;

4) Establish connectivity to Exchange which can include, but is not limited to, establishing technical connectivity between the source system(s) and the exchange; and 5) Provide historical information which can include, but is not limited to, at the sender's or senders' request(s), provide the exchange with any historical information needed to enable exchange services that the sender(s) wish(es) to use.

Illustrative Examples of the Channels' On-Boarding

In some embodiments, the channels onboard to the illustrative electronic communications exchange of the instant invention to receive the content (on behalf of the Recipient(s)) from the senders via the illustrative electronic communications exchange of the instant invention. In some embodiments, during the onboarding process, the channels can perform at least one or more of the following activities, in one or more predetermined or non-predetermined order:

1) Agree to a Business Exchange Contract which can include, but is not limited to, the legal terms of the exchange, including rules and obligations of the channel system(s) and of the exchange;

2) Define the header format of Distributions which can include, but is not limited to, defining the data format for the header information of the distributions that will be sent via the exchange;

3) Define channel capabilities which can include, but is not limited to, various capabilities the channel(s) can support in the delivery of the distributions to the recipient(s); such capability as, but is not limited to, the rules collection, how the recipient(s) is/are authenticated and/or identified, the level of security supported, the storage of distribution and/or support for dual distribution;

4) Define Security protocols which can include, but is not limited to, defining the security protocols for the transmission of data between the channel system(s) and the exchange, including (but is not limited to) authentication, identification, and/or encryption for both data and transport mechanisms;

5) Establish connectivity to Exchange which can include, but is not limited to, establishing technical connectivity between the source system(s) and the exchange; and 6) Add the sender(s) to channel(s) which can include, but is not limited to, exposing the sender(s) identity(ies) to the channel(s).

Illustrative Examples of the Recipients' On-Boarding

In some embodiments, the recipients onboard to the illustrative electronic communications exchange of the instant invention via the channel(s) to receive distributions according to the recipients' rules. In some embodiments, during the onboarding process, the recipients can perform at least one or more of the following activities, in one or more predetermined or non-predetermined order:

1) Agree to a Business Exchange Contract which can include, but not limited to, legal terms of the illustrative electronic communications exchange of the instant invention, rules and obligations of the channel system(s) and of the exchange (in some embodiments, the instant invention assumes that there is a relationship between the recipients and the channel(s) separately from the relationship between i) the channel(s) and/or the recipients and ii) with the exchange);

2) Verify Identify which can include, but is not limited to, providing information to verify the recipient's identity (in some embodiments, the instant invention assumes that the authentication has been established by the channel and the recipient); and 3) Establish rules which can include, but is not limited to, establishing rules for the receipt of distributions such as, but is not limited to: i) general rule(s), applying to (a) all senders, (b) all channels, and/or (c) all distribution types; ii) specific rule(s), applying to (a) a single sender, (b) a single channel and/or (c) a single distribution type, or any combination of i)(a) to ii)(c).

Figure 7:
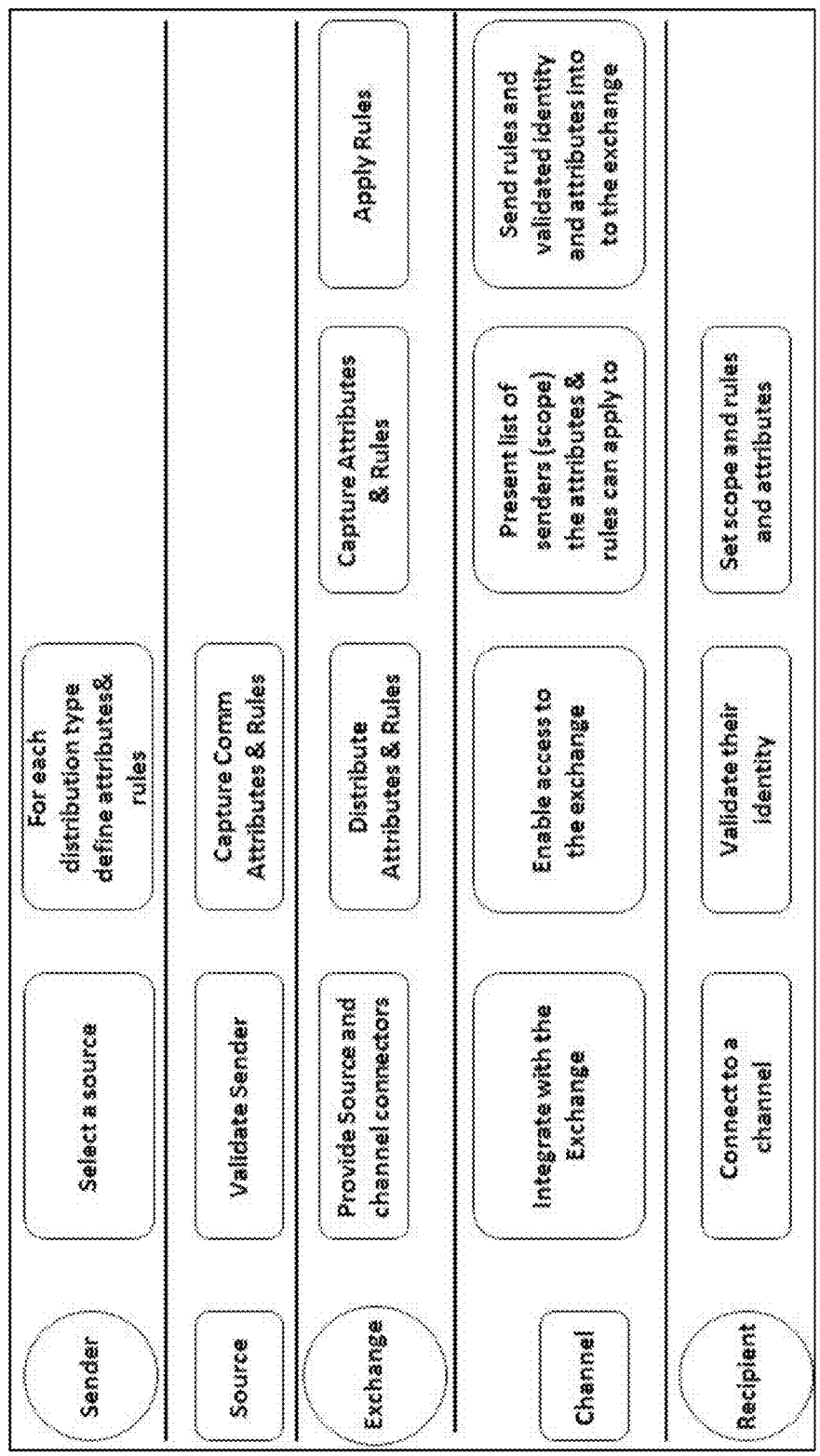

FIG. 7 illustrates illustrative processes that, in some embodiments, the illustrative electronic communications exchange of the instant invention can utilize for capturing, applying, distributing, and/or maintaining the sender attributes and/or rules, and/or the recipient attributes and/or rules in accordance with some embodiments of the instant invention.

As FIG. 7 shows, in some embodiments, the illustrative electronic communications exchange of the instant invention can mediate capturing, applying, distributing, and/or maintaining rules among parties in accordance with at least the following:

Senders: the sender attributes and/or rules define/identify the rules by which distributions can be delivered, —for example, in some embodiments, the sender rules may include, but are not limited to, supported channel(s), enabled source(s), identity validation and consent (e.g., legal consent) requirement(s), timing of delivery, etc.; in some embodiments, the sender rules may be also set for a specific distribution type, across a category of distribution types, or across all distribution types;

Sources: the source systems integrate with the illustrative electronic communications exchange of the instant invention to capture the sender rules as well as defining the source system rules regarding the types of distributions enabled through the source system(s);

Exchange: the illustrative electronic communications exchange of the instant invention facilitates the capturing of the sender rules and/or the recipient rules through the source(s), channel(s) and/or administrative interface(s), ensuring that all rules are being followed during the delivery process and distributing appropriate rule information to the senders, the recipients, the sources and the channels;

Channels: the channels integrate with the illustrative electronic communications exchange of the instant invention to capture the recipient rules and/or broadcast, to the exchange, channel-specific rules defining at least one of the type(s) of distributions that can be supported, delivery timing capabilities, validation capabilities (e.g., identity verification), etc.; and Recipients: the recipient rules can define/identify/select at least one of: the channel(s) that the recipients would like to use, the type of communications/distributions that the recipients would like to distribute, validation information, etc.; in some embodiments, the recipients may set rules for at least one of: a distribution type, a single sender, across an industry, and/or universally.

Figure 8:
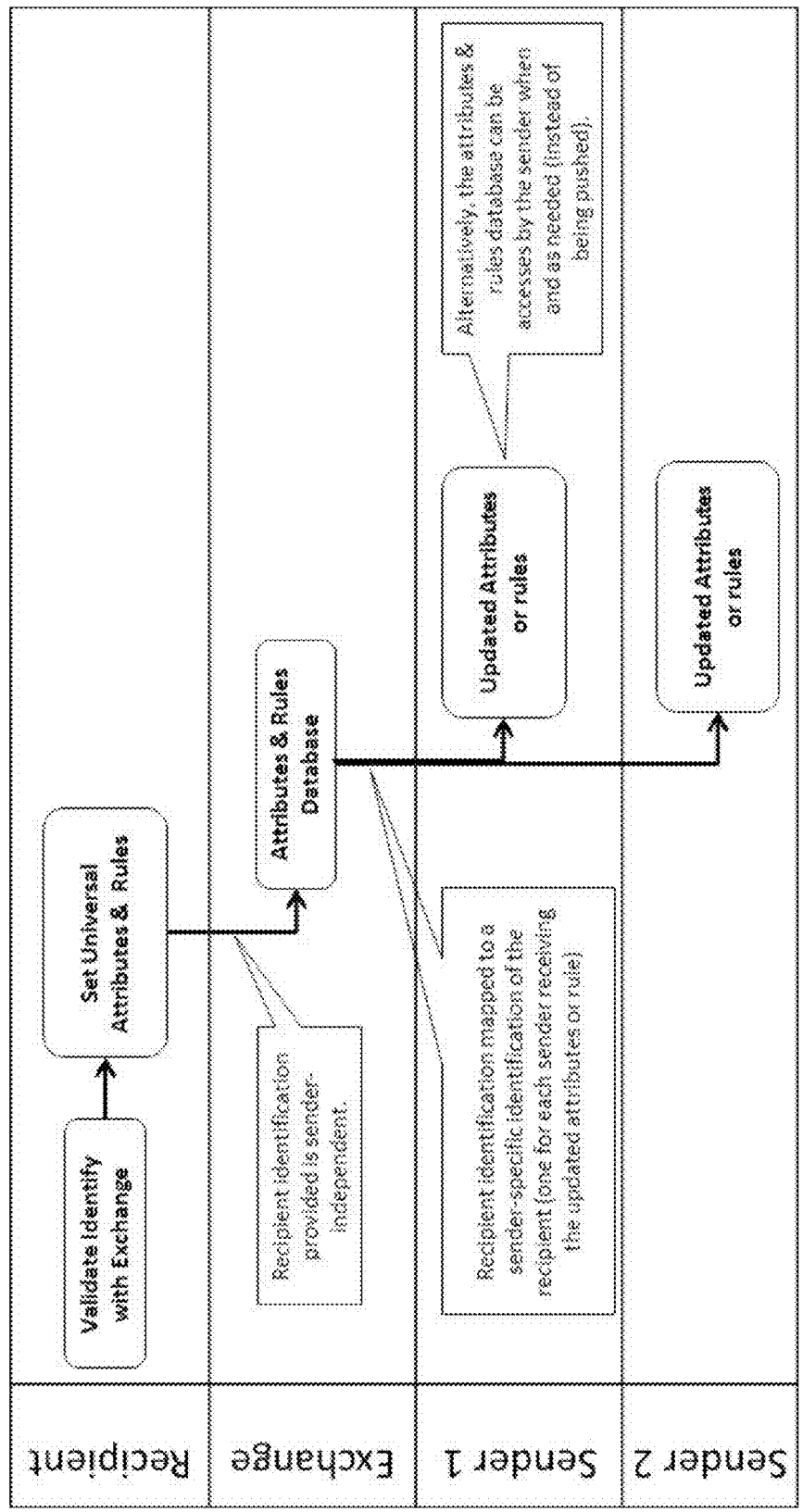

FIG. 8 illustrates illustrative processes associated with capturing, applying, displaying, distributing, and/or maintaining the recipient attributes and/or rules concerning the exchange's functionalities in accordance with some embodiments of the instant invention.

Figure 9:
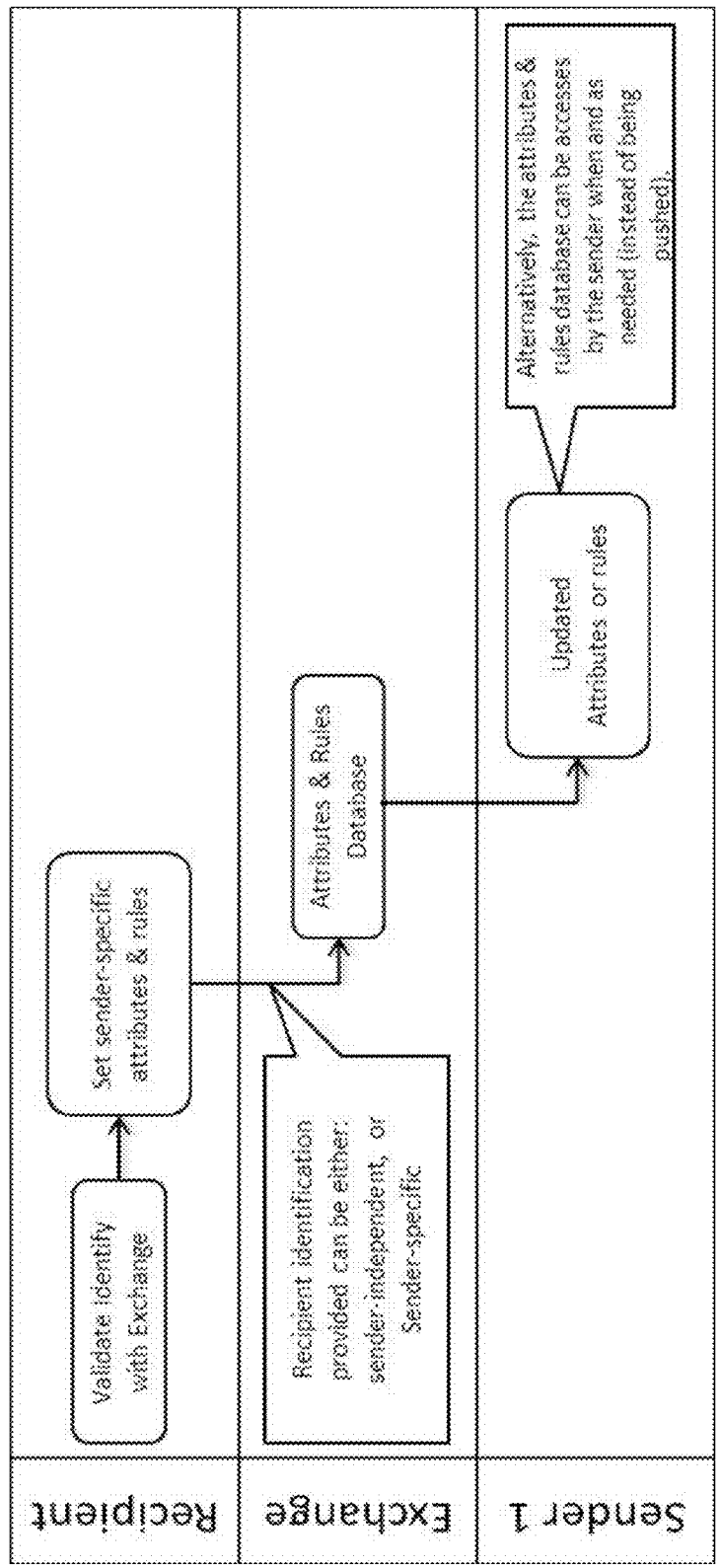

FIG. 9 illustrates illustrative processes associated with capturing, applying, displaying, distributing, and/or maintaining the recipient attributes and/or rules concerning the sender(s) in accordance with some embodiments of the instant invention.

Figure 10:
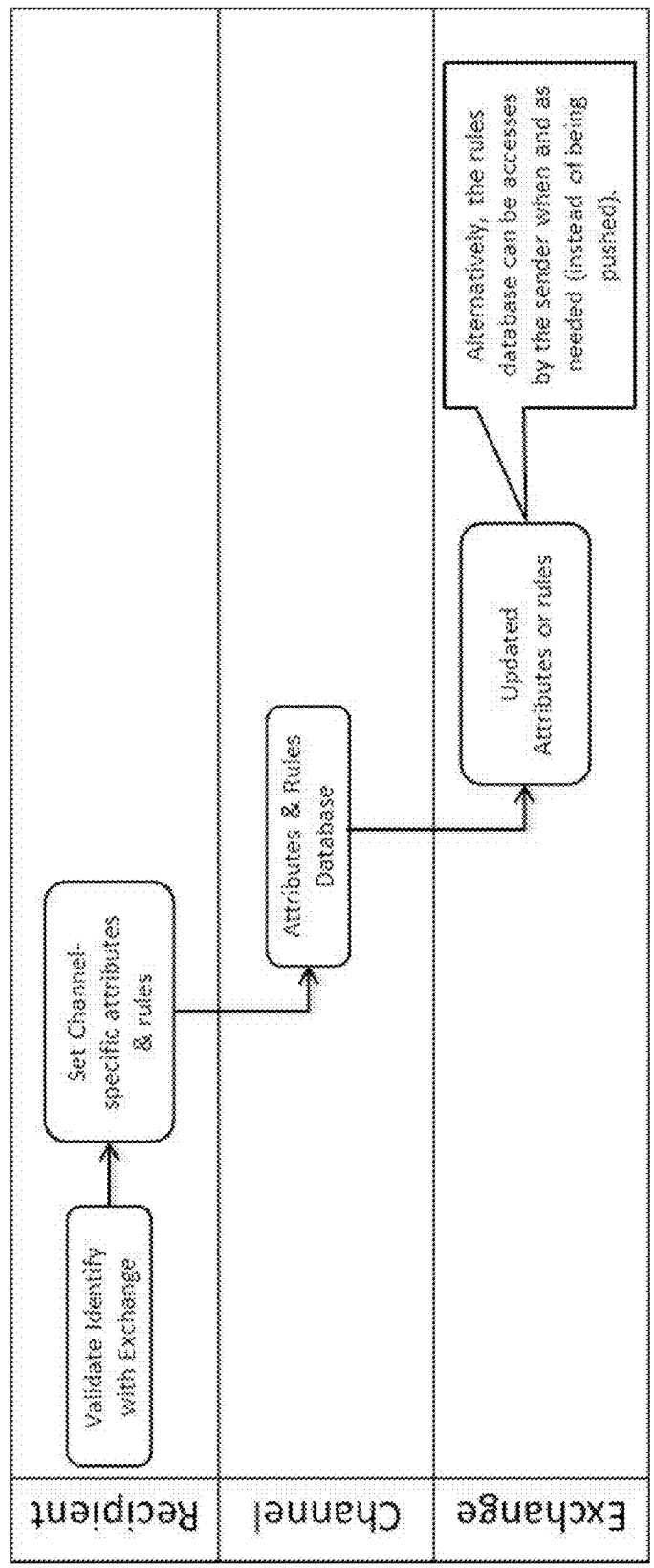

FIG. 10 illustrates illustrative processes associated with capturing, applying, displaying, distributing, and/or maintaining channel-dependent recipient attributes and/or rules in accordance with some embodiments of the instant invention.

Figure 11:
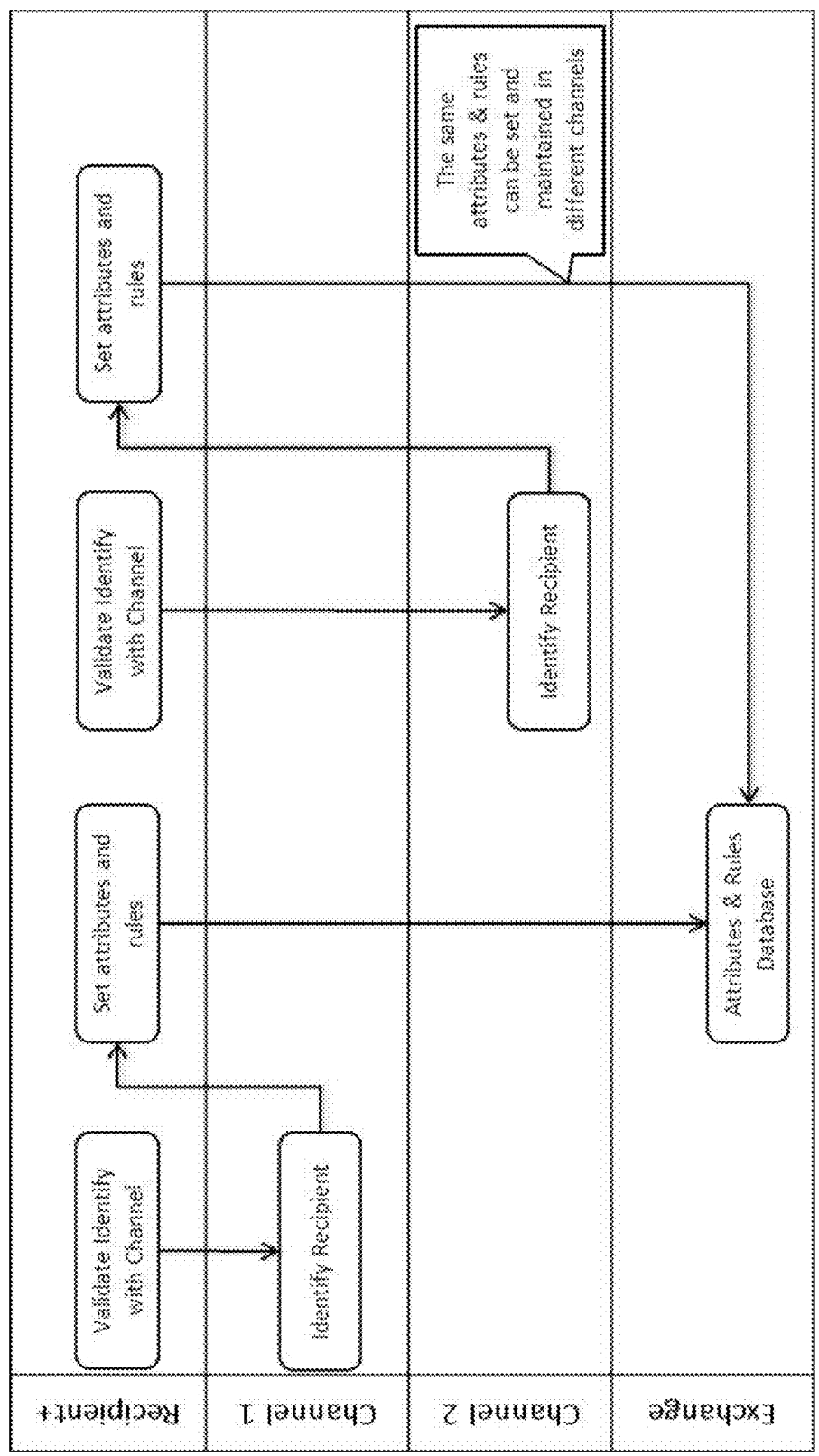

FIG. 11 illustrates illustrative processes associated with capturing, applying, displaying, distributing, and/or maintaining channel-independent recipient attributes and/or rules in accordance with some embodiments of the instant invention.

Figure 12:
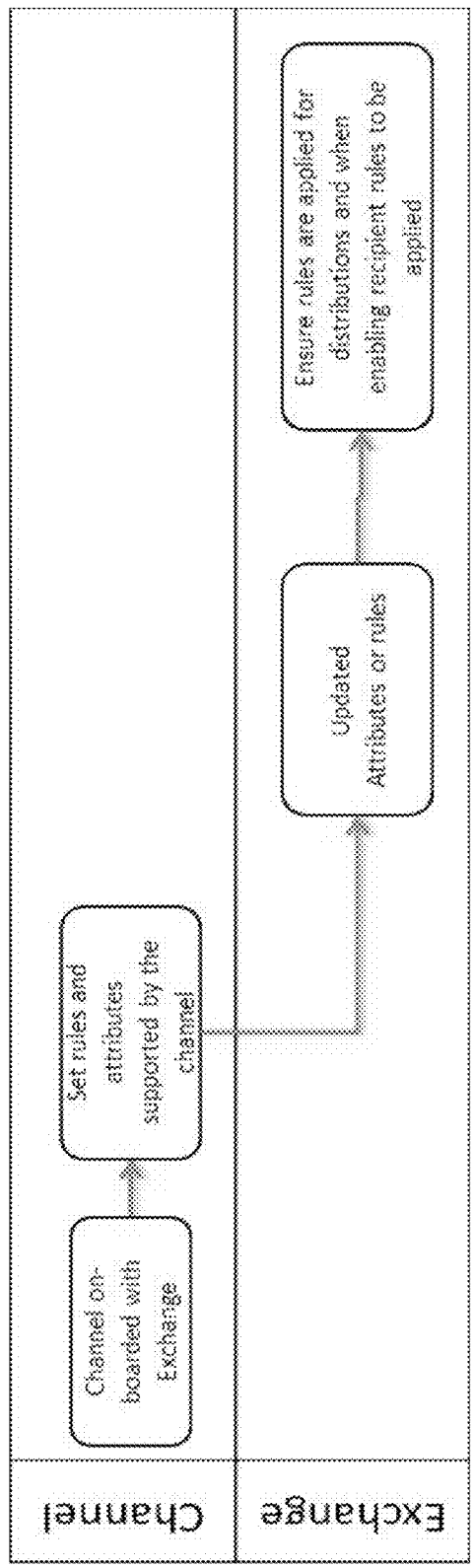

FIG. 12 illustrates illustrative processes associated with capturing, applying, displaying, distributing, and/or maintaining the channel specific attributes and/or rules which define/identify/select the capabilities of the channel(s), including, but is not limited to, the types of distributions supported.

Figure 13:
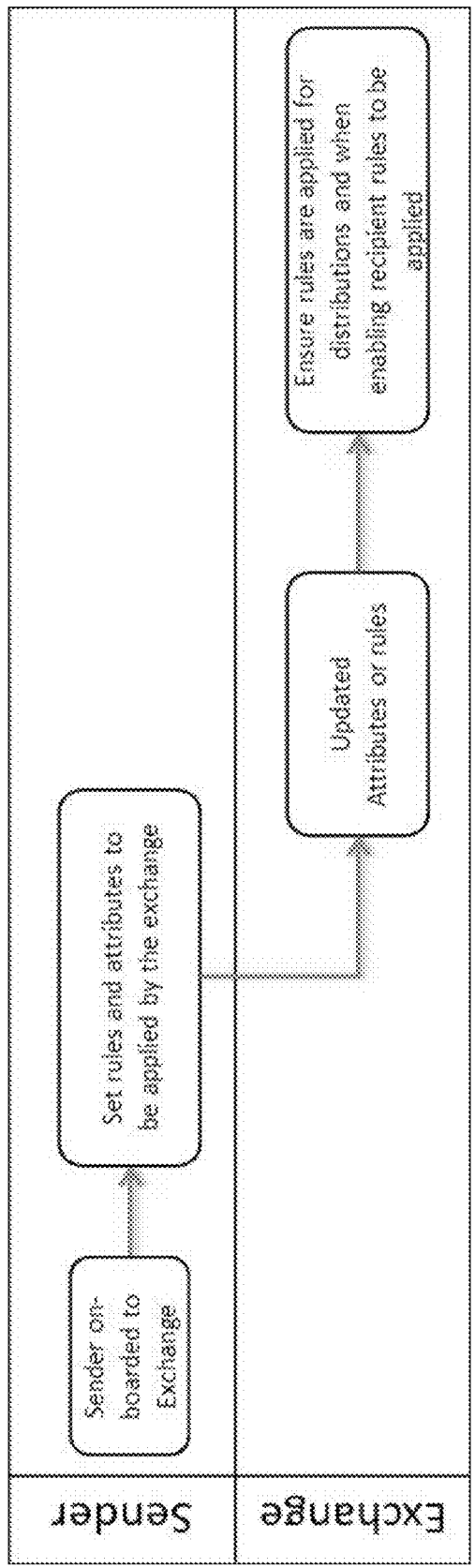

FIG. 13 illustrates illustrative processes associated with capturing, applying, distributing, displaying, and/or maintaining the sender attributes and/or rules which define/identify/select the rules that the senders would liked to be followed, including, but is not limited to, rules at least about one of what sources the senders are authorizing to send distributions on their behalf, the specifics and/or attributes of a channel that the senders require to enable a particular channel for delivery the distributions.

Figure 14:
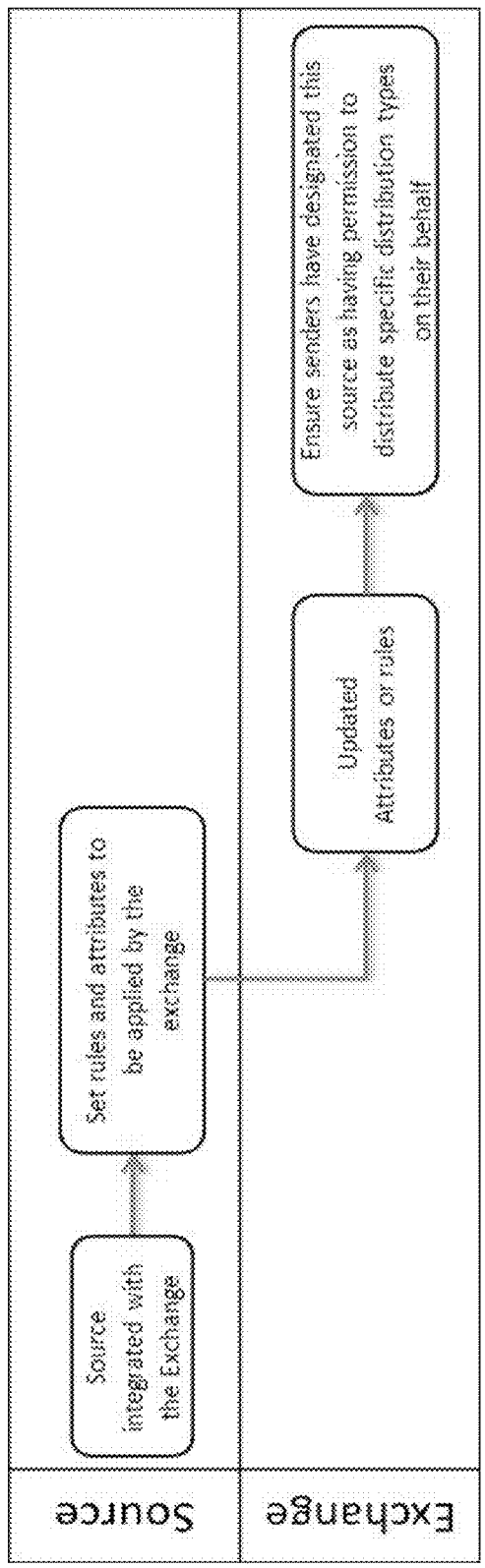

FIG. 14 illustrates illustrative processes associated with capturing, applying, displaying, distributing, and/or maintaining the source specific attributes and/or rules which define/identify/select the capabilities of the source(s), including, but is not limited to, the types of distributions supported on behalf of the senders.

Illustrative Examples of Universal Rules & Attributes

In some embodiments, the illustrative electronic communications exchange of the instant invention allows the senders and the recipients at least to set rules and to define the scope of those rules, such that through a single action the recipients and the senders can define one or more rule that will apply across a single sender/channel or any combination of the senders and/or the channels. For example, in some embodiments, through a particular channel, each recipient could set one or more rule(s) to receive client statements (e.g., bank statements, account statements, trade confirmations, other personal information) and define that such recipient would like the rule(s) to apply across at least one of: a distribution type, across an account, across a single sender, across an industry, across all senders available on the exchange, etc. In some embodiments, the illustrative electronic communications exchange of the instant invention allows to simplify the senders experience around defining rule(s).

Illustrative Examples of Consent Capture

Typically, within many industries capturing a rule from a recipient must also include the capturing of a legal consent for the sender to apply that rule. For example, within the brokerage industry after capturing a rule to distribute communications electronically (e.g., account statements, trade confirmations, government mandated materials about investments, etc.), an investor must agree to terms and conditions to legally receive that content through a digital channel. In some embodiments, within the exchange of the instant invention allows to capture the consent by allowing the recipient to set rule(s) and then receive notification(s) that the recipient's consent is also required through a particular channel selected by such recipient.

For example, in some embodiments, if a recipient sets rule(s) to receive statements, from any company that the recipient has one or more relationship(s), through a particular channel, the exchange would initiate an account discovery process to identify such relationship(s). In some embodiments, once such relationship(s) has/have been identified, if a consent is required, the exchange would deliver a message, through the channel, to the recipient, requesting the recipient to agree to the consent language. Once the recipient agrees, such rule(s) would not be applicable.

Illustrative Examples of Discovery of Relationships

In some embodiments, the illustrative electronic communications exchange of the instant invention performs the discovery of relationships which includes, but is not limited to, processes to identify relationships between the senders and the recipients, enabling the flow of information.

In some embodiments, the discovery can be done using, for example, at least one of at least three following approaches, or any combination of these approaches:
  i) Exchange-based discovery,
  ii) Sender-based discovery, and
  iii) Channel-based discovery.

In some embodiments, in all three cases (or in combinations of cases), the discovery can yield at least one of the following results:
  i) suggestion(s) to particular recipient(s) to set rule(s) for distributions from particular sender(s), and
  ii) distribution(s) from such sender(s).

In some embodiments, the result of the discovery process depends, at least in part, on the sender's distribution rules.

Figure 15:
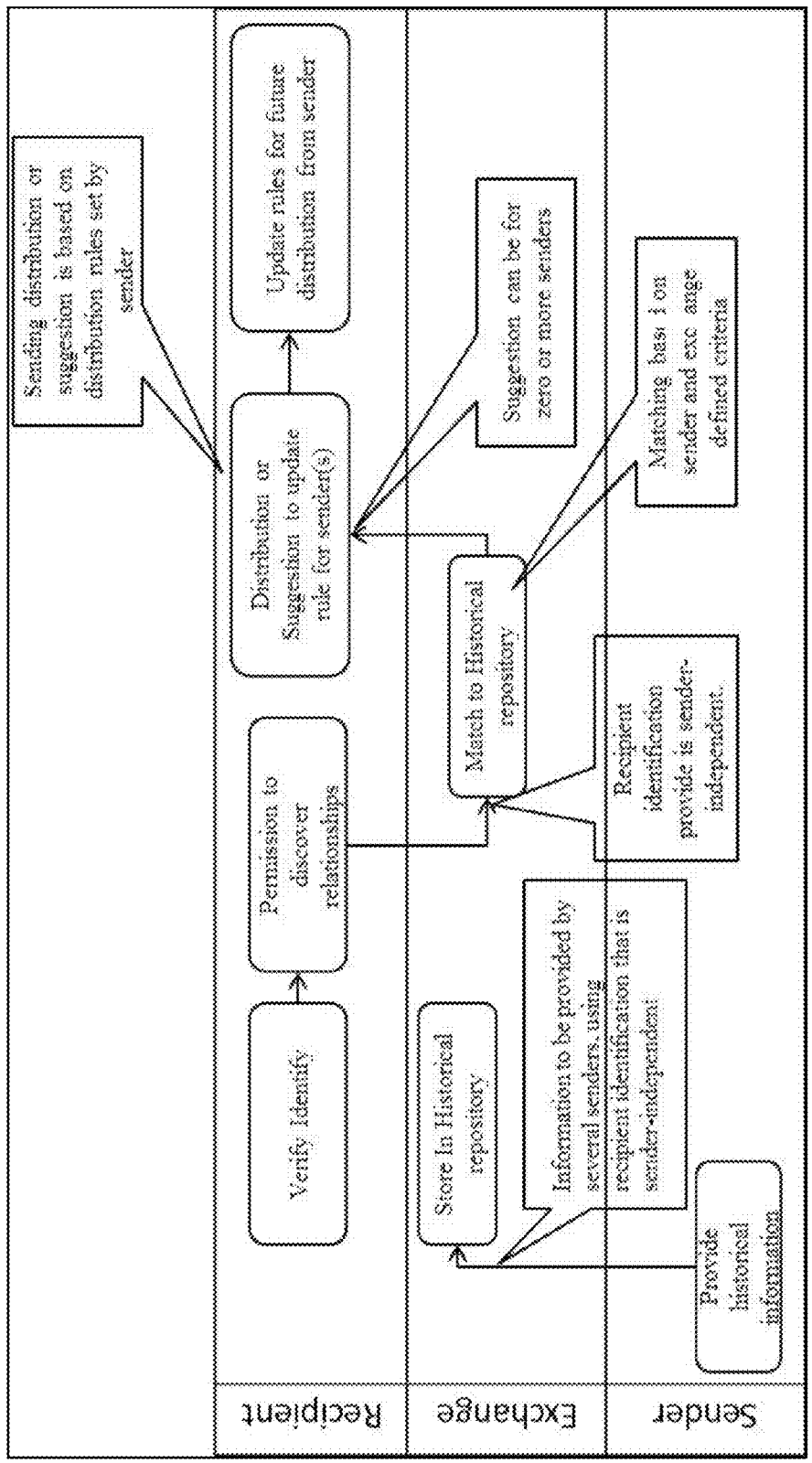

FIG. 15 illustrates exemplary processes for the exchange-based discovery of relationship to identify relationships between the senders and the recipients, enabling the flow of information in accordance with some embodiments of the instant invention.

Figure 16:
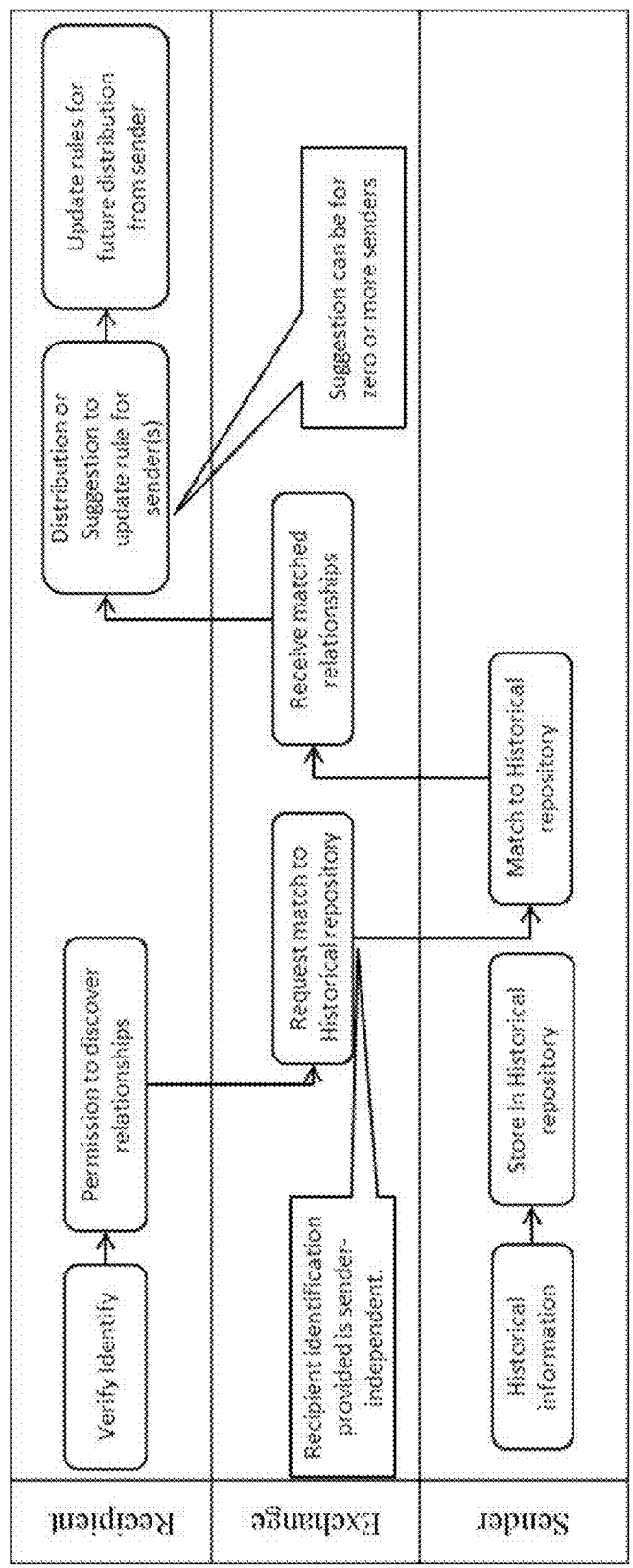

FIG. 16 illustrates exemplary processes for the sender-based discovery of relationship to identify relationships between the senders and the recipients, enabling the flow of information in accordance with some embodiments of the instant invention.

Figure 17:
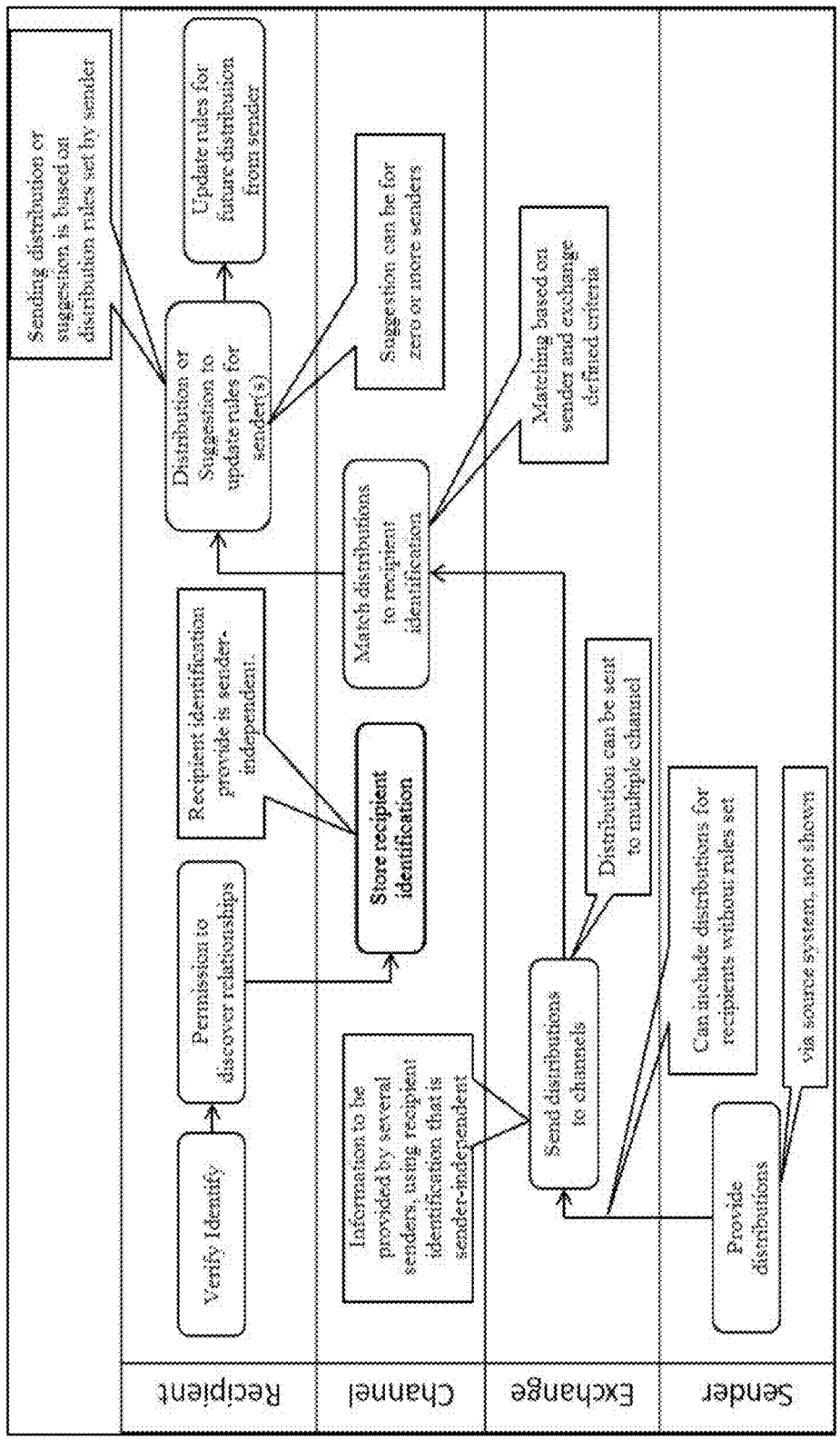

FIG. 17 illustrates exemplary processes for the channel-based discovery of relationship to identify relationships between the senders and the recipients, enabling the flow of information in accordance with some embodiments of the instant invention.

Illustrative Examples of Delivery of Distributions

In some embodiments, the illustrative electronic communications exchange of the instant invention performs the delivery of distributions from the sender(s) to the recipient(s) based, at least in part, upon defined rules.

In some embodiments, the delivery of distributions can be done using at least one of at least three of the following approaches, or any combination of these approaches:
  Exchange-based rules,
  ii) Sender-based rules, and
  iii) Channel-based rules.

In some embodiments, the above illustrative approaches are defined by variations on at least three steps in the distribution process:
  i) applying the sender's distribution rules,
  ii) matching a sender's recipient's identification to a channel's recipient's identification, and
  applying the recipient's delivery rules.

Figure 18:
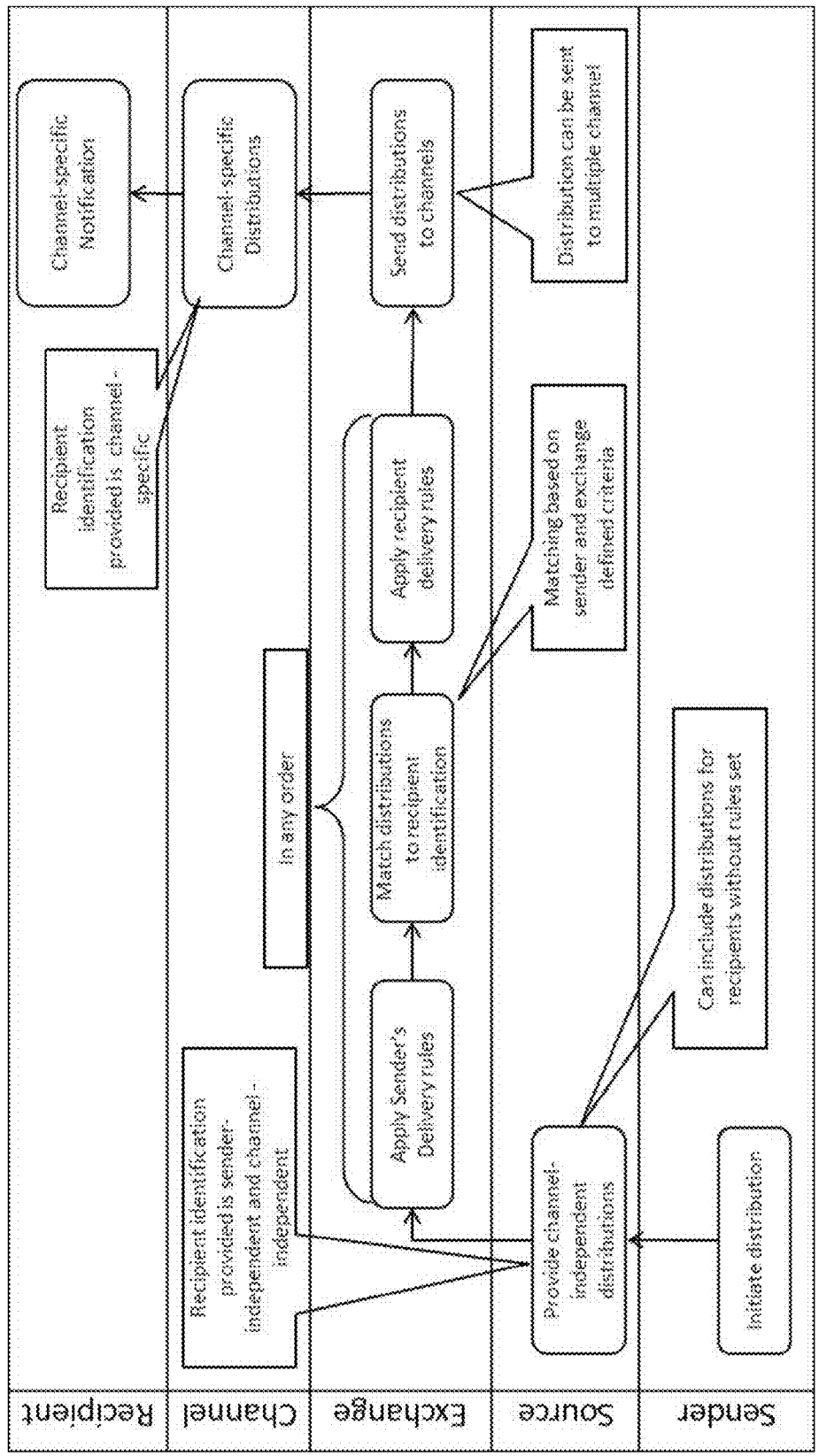

FIG. 18 illustrates exemplary processes, utilizing the exchange-based rules, for delivery of distributions from the sender(s) to the recipient(s) in accordance with some embodiments of the instant invention.

Figure 19:
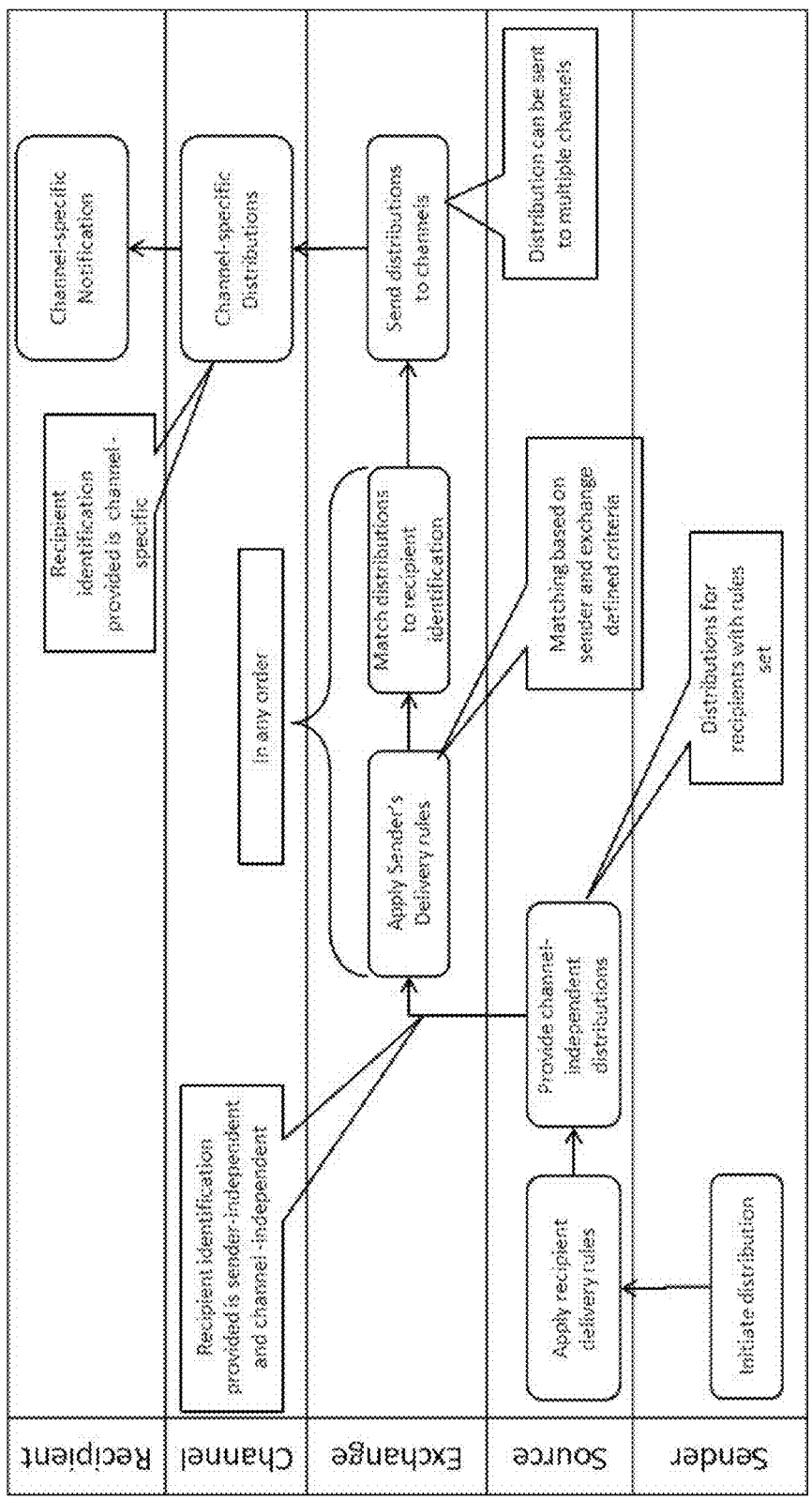

FIG. 19 illustrates exemplary processes, utilizing the source-based rules, for delivery of distributions from the sender(s) to the recipient(s) in accordance with some embodiments of the instant invention.

Figure 20:
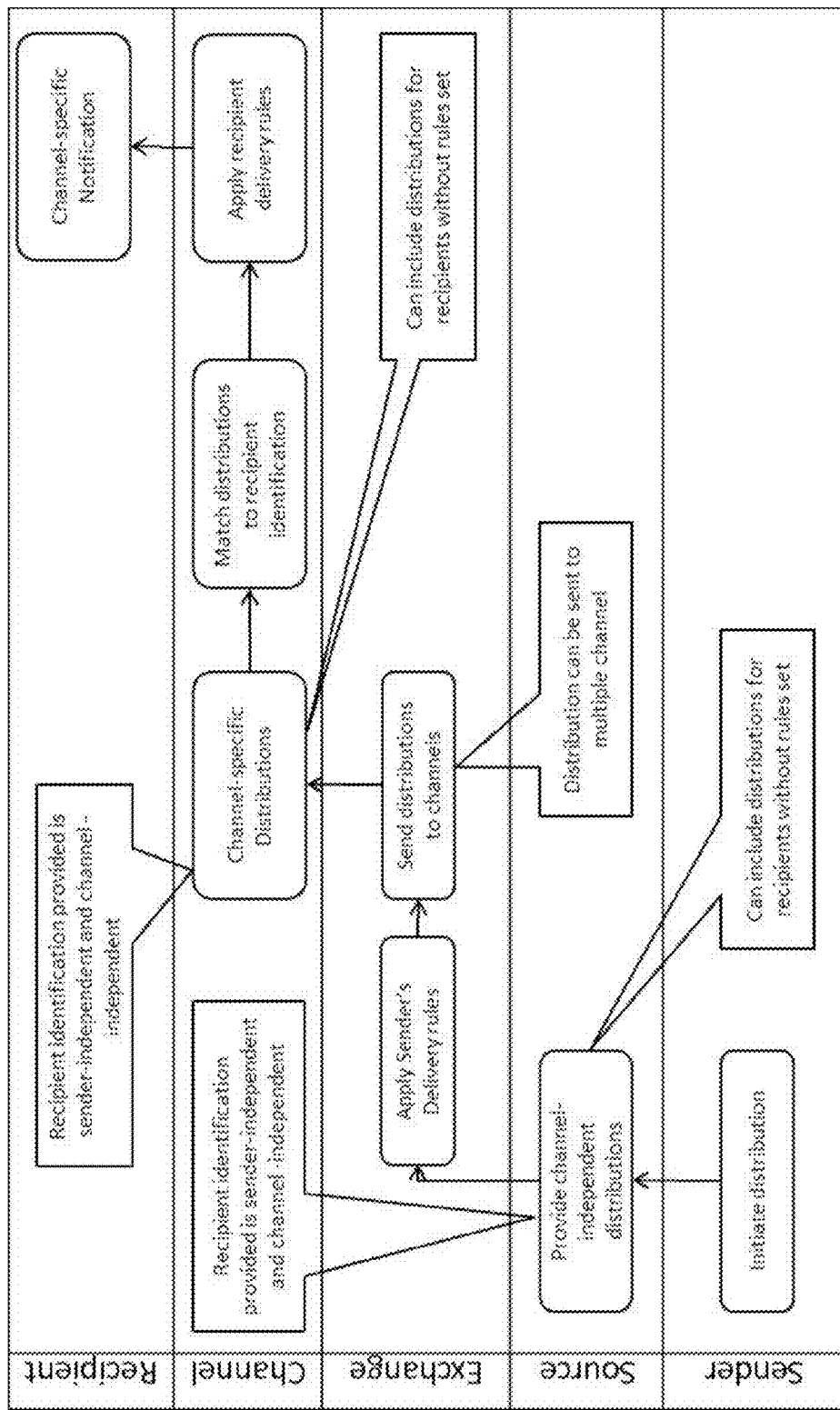

FIG. 20 illustrates exemplary processes, utilizing the channel-based rules, for delivery of distributions from the sender(s) to the recipient(s) in accordance with some embodiments of the instant invention.

Illustrative Examples of Insight Functionality

In some embodiments, the illustrative electronic communications exchange of the instant invention keeps an audit trail as the distributions flow through the exchange, such audit trail can include, but is not limited to, updates to rules and attributes, and other changes that occurs with and/or caused by the recipients, the senders, the channels, the exchange, and/or the sources. In some embodiments, through the integration with the channel(s), the exchange updates/matches/validates the exchange collected data. In some embodiments, the illustrative electronic communications exchange of the instant invention allows the senders to gain insight into the delivery of their distributions. For example, the audit trail data and/or the audit trail data enriched with data provided by various channels and/or sources can be used to provide at least one of the following, but is not limited to:
  i) comprehensive audit trail of distributions, useful, for example, to demonstrate regulatory compliance and/or delivery;
  ii) insight into how the recipients are, for example, using the communications they receive;
  iii) allowing the senders to perform anonymous analysis, utilizing various analytical tools, to determine, for example, which components of the distribution are most interesting to the recipients; and
  iv) determining how to integrate communications and/or combine content effectively for various classes of the recipients; and
  v) performing other suitable reporting and/or analysis.

Figure 21:
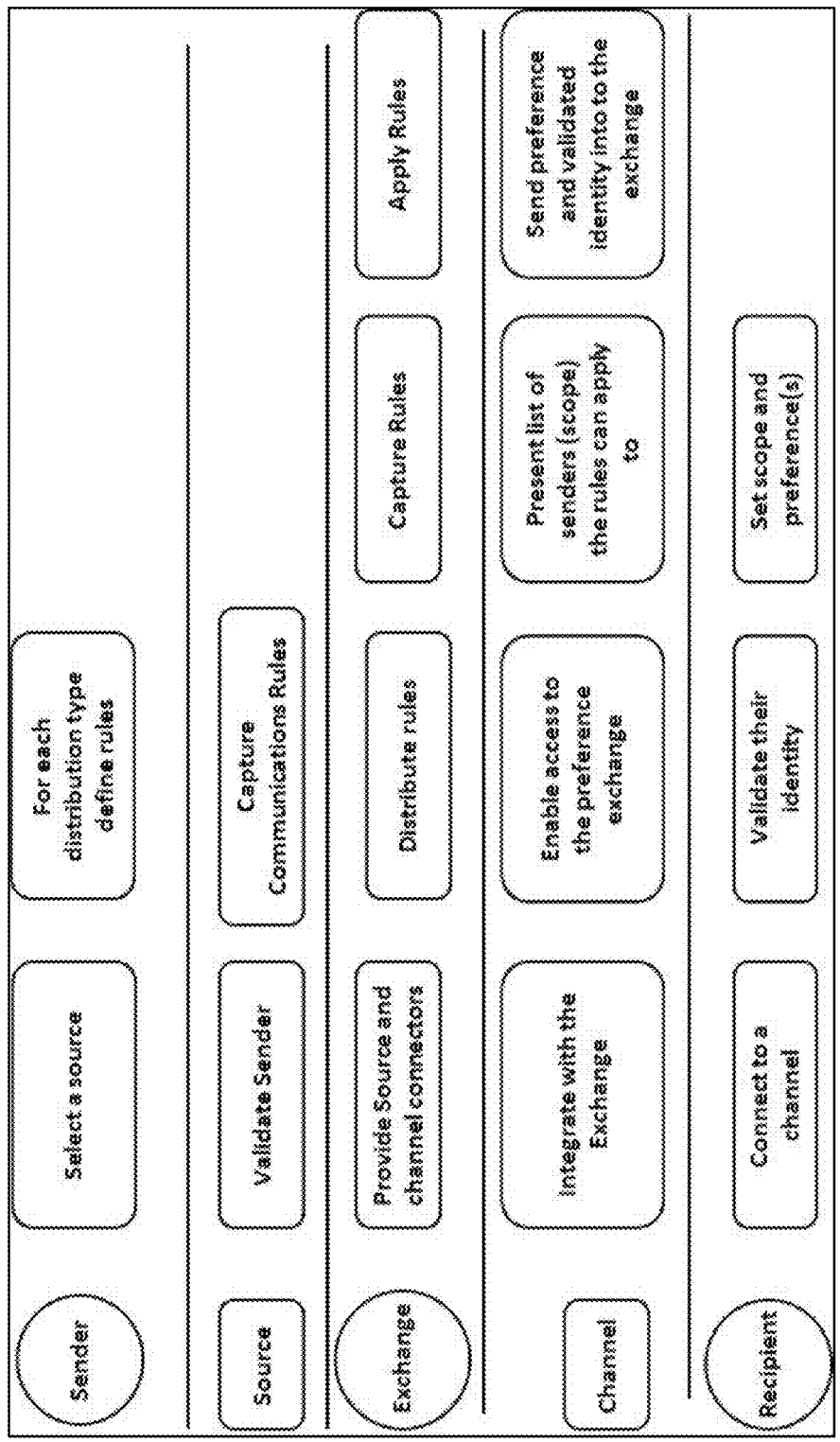

FIG. 21 illustrates exemplary audit trail activities and reporting capabilities in accordance with some embodiments of the instant invention.

Illustrative Examples of Rules Utilized by the Instant Invention

In some embodiments, the sender(s) set/select/define at least one or more rules regarding at least the following categories associated with the senders, but are not limited to:
  Identifiers;
  Identity Validation Level;
  Rule capture;
  Consent capture:
  at least language;
  Per Distribution types, at least one or more of the following parameters:
  Name
  Delivery requirements (e.g., timeframe, etc.)
  Valid Source(s); and
  Legal language acceptance.

In some embodiments, the sender(s) set/select/define at least one or more rules regarding at least the following categories associated with the recipients, but are not limited to:
  Validated Identity;
  Capture rules, such as, but is not limited to:
  —Channel per distribution type; and
  Consent.

In some embodiments, the sender(s) set/select/define at least one or more rules regarding at least the following categories associated with the sources, but are not limited to:

Validation of their identity;
Agreement to rules of the exchange; and
Agreement on Identifiers (e.g., header identifies to be used).

In some embodiments, the sender(s) set/select/define at least one or more rules regarding at least the following categories associated with the channels, but are not limited to:
Validation of the identity;
Agreement to the rules of the exchange;
Delivery rules they are willing to support; and
Pricing Model.

Illustrative Examples of Binding of Rules

In some embodiments, the late binding of rules ensures that recipient rules are being followed and that the channel designated for delivery has agreed to rules defined by the sender(s), such as, but is not limited to, at least one of:
i) channel must agree to validating the identity of the recipient;
capturing the recipient's rules;
capturing a specific consent and/or common consent;
maintaining an audit trail; and
pricing of x amount or less than x amount Illustrative Examples of Appling the Instant Invention: Newsstand Application Channel In some embodiments, the instant invention is utilized in the form of an application that would be made accessible to the end consumer through the newsstand or app stores that power the distribution of software to digital devices. In some embodiments, a newsstand application in accordance with the instant invention can include components that provide one of or more of at least the following capabilities:
Identity Management—a component that verifies and ensures the identity of the end user;
Rule Management—a component that captures delivery rules at the consumer level vs. the account level regarding the format(s) and/or channel(s) to use (e.g., the recipients to use the delivery rules to communicate with firms that the recipients have relationships with);
Account Matching—a component that matches verified identities of recipients and/or the sender(s) with their existing financial services accounts;
Consent Management—a workflow component that captures appropriate legal consents to enable the distribution of communications digitally;
Notifications—a notification component that distributes notifications containing meta data highlighting the availability of a new communication to the end user through the Newsstand application;
Document Retrieval—a retrieval component that retrieves the underlying document(s)/communication(s) stored within distributed and/or centralized data bases for purposes of presentation within the Newsstand application; and
Presentation—a presentation component that presents the underlying communication(s) within the Newsstand application.

In some embodiments, the newsstand application can reside on a consumers tablet device. In some embodiments, the newsstand application includes programmable interface(s) or web service based interfaces that a user can utilize in accordance with principles of the instant invention.

Figure 22:
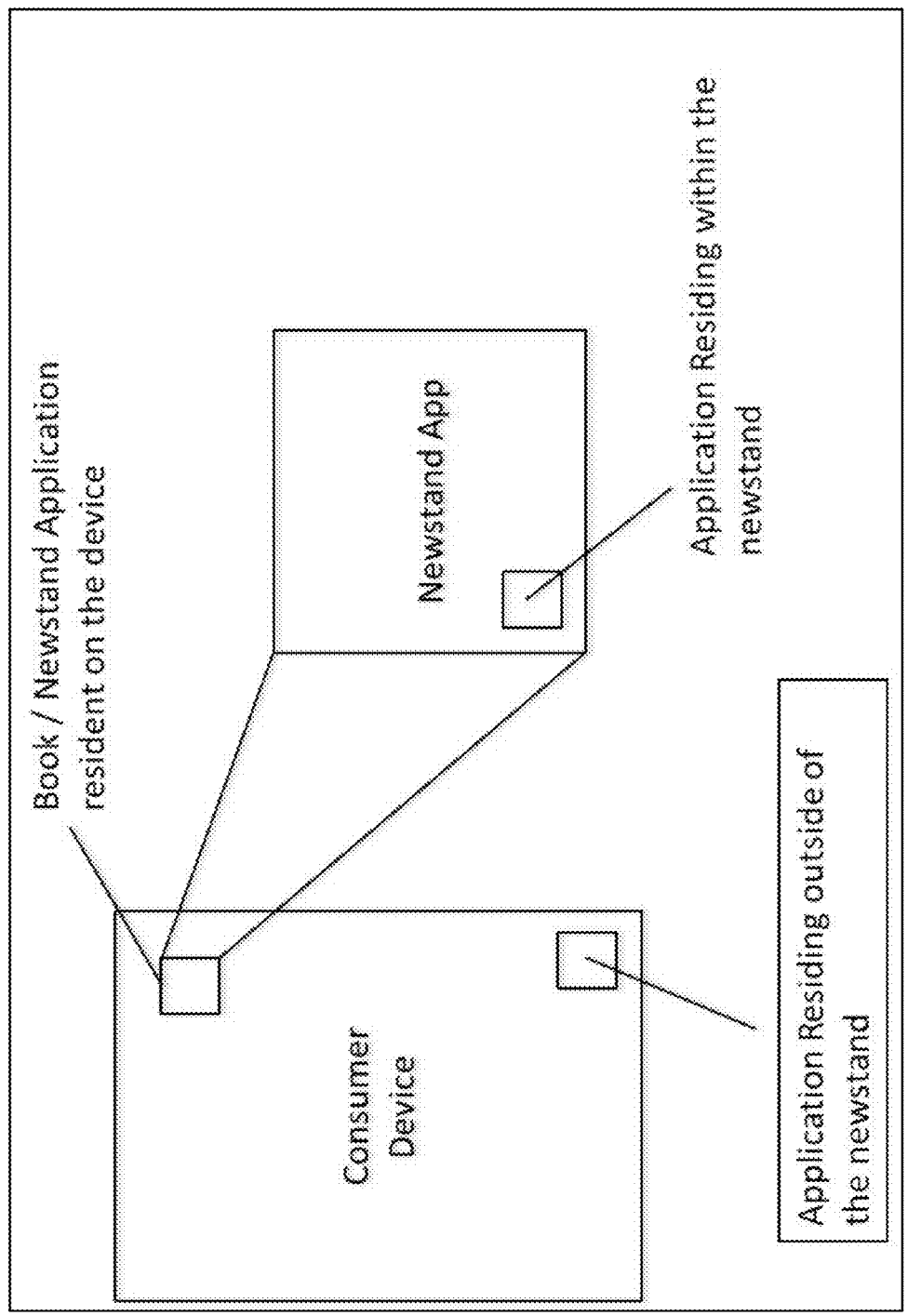

In some embodiments, consumer installs the application by selecting the app through the devices app store or newsstand (FIG. 22, for example, shows various illustrative methodologies of accessing the Newsstand app). In some embodiments, a device manufacturer can pre-install the application and makes it available through the newsstand or as a stand-alone application. In some embodiments, the verification process of the instant invention can also be accomplished in one or more of the following ways, but is not limited to:
1. once a user has accessed the application for the first time, the user is asked to provide several pieces of information that can be independently verified, and the verification process then verifies the user's identity based on information provided; and
2. the user receives a separate communication through a regular and/or electronic mail which provides an access code in the form of a URL, QR Code, or other similarly suitable mechanism that allows the user to both access the application and verify the user's identity in one step.

Figure 23:
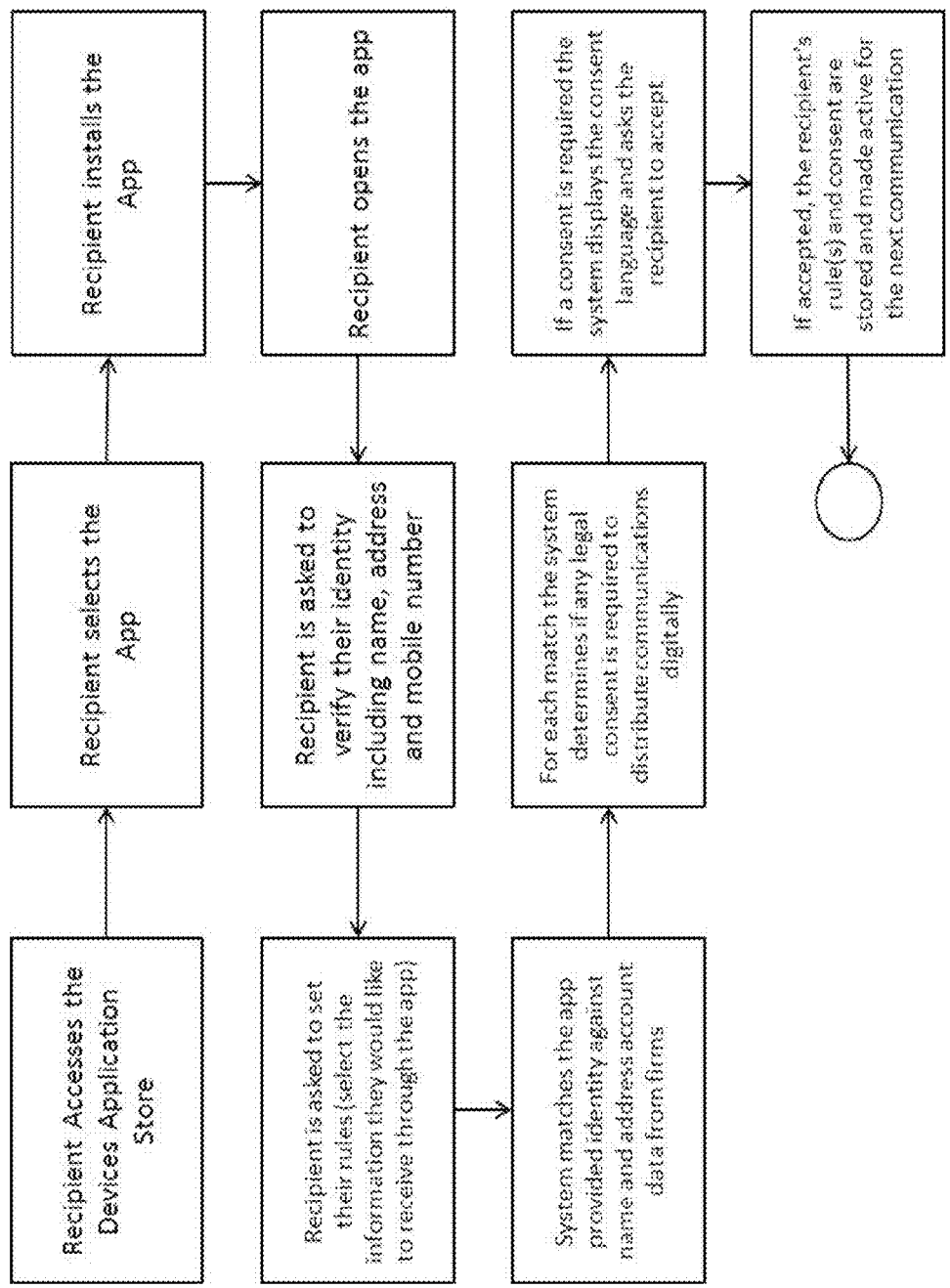

FIG. 23 shows an illustrative flowchart of accessing the Newsstand application in accordance with some embodiments of the instant invention.

Figure 24:
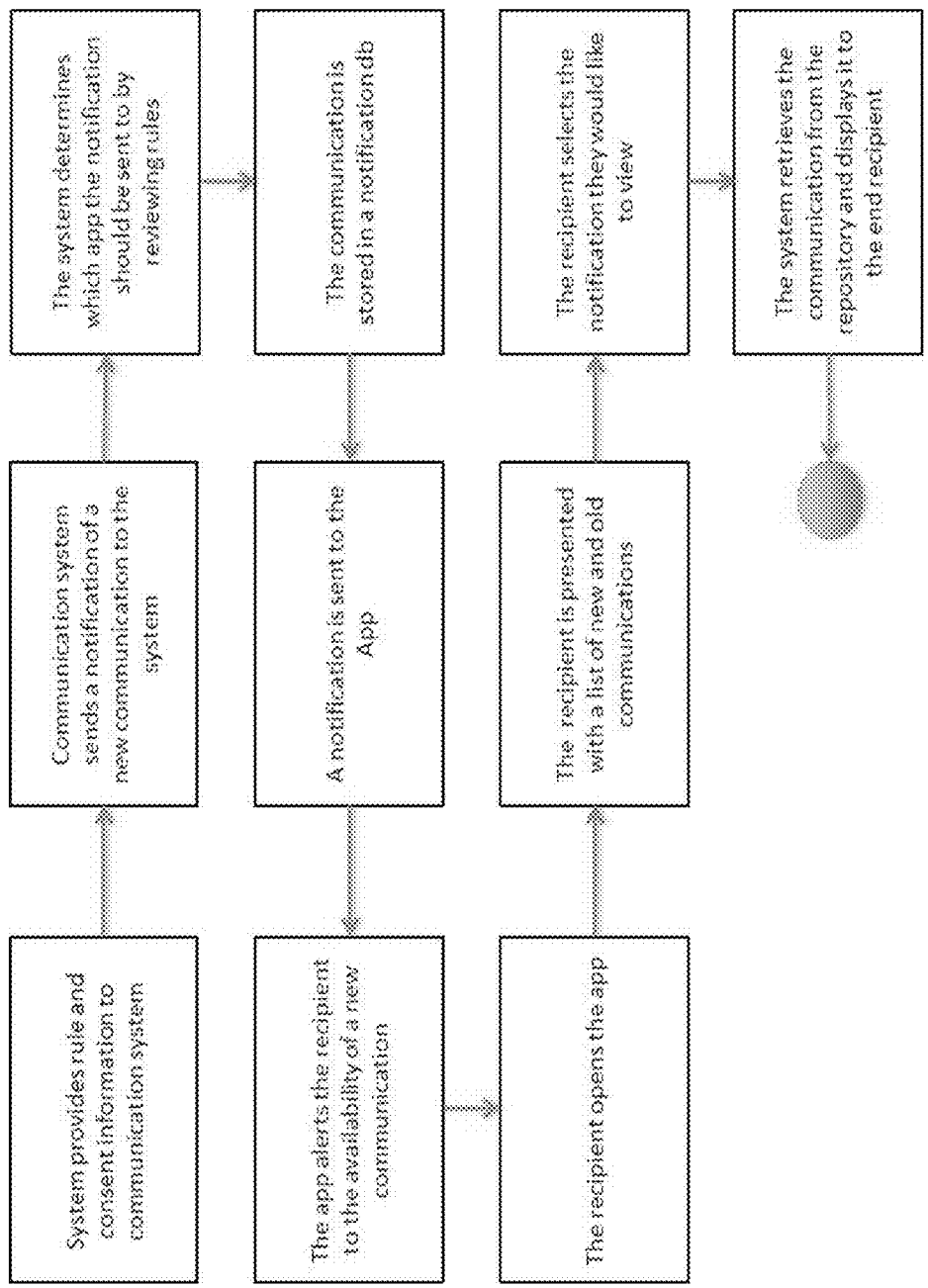

FIG. 24 shows an illustrative flowchart of delivering distributions utilizing the Newsstand application in accordance with some embodiments of the instant invention.

Further Illustrative Examples of the Instant Invention

In some embodiments, the onboarding of a recipient through a particular channel (e.g., being tied to identity) utilizes the identity mapping (e.g., recipient's identity mapped to sender's version(s) of the recipient identity).

In some embodiments, the rule exchange can involve, but is not limited to, the identity authentication, followed by the setting of rules for the recipient, scope of the rules, and distribution of the rules (e.g., staying within the exchange).

In some embodiments, the instant invention involves the account discovery which includes, but is not limited to, identifying potential relationships from historical distributions when a particular recipient is identified by the exchange based, at least in part, on identifying information received from such recipient and/or from a third party about such recipient.

In some embodiments, the instant invention involves capturing a particular recipient's consent, generally from rule(s) defined/selected by such recipient, and/or a set of common rules.

In some embodiments, the distribution processing can involve, but is not limited to, at least one of the following illustrative actions: the sending of a distribution, the applying of a rule, the delivery of the distribution through the correct channel to the recipient, and the auditability.

In some embodiments, the instant invention is utilized for document retrieval.

In some embodiments, the instant invention allows the insight and the auditability throughout the exchange.

In some embodiments, the instant invention utilizes at least one specialized programming languages, such as XML and JSON, to deliver the distributions through the exchange of the instant invention.

Further Illustrative Operating Environments

FIG. 1 illustrates an environment in which some embodiments of the present invention can operate. However, not all of these components may be required to practice the invention, and variations in the arrangement and type of the components may be made without departing from the spirit or scope of the invention. In some embodiment, the exchange of the instant invention hosts/communicates with a large number of the senders and the recipients (e.g., at least 1,000, at least 10,000; at least 100,000; at least 1,000,000) and processes a large number of concurrent transactions (e.g., at least 1,000; at least 10,000; at least 100,000; at least 1,000,000). In some embodiments, the illustrative exchange of the instant invention is based on a scalable computer and network architecture that incorporates varies strategies for assessing the data, caching, searching, and database connection pooling. In some embodiments, an example of the scalable architecture is an architecture that is capable of operating multiple servers.

In embodiments, members of the inventive computer system 102-104 (e.g., the sources and the channels connected to the exchange) include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, mobile computing device, cell phone, smartphones, tablets, and any other device that is equipped to communicate over a wired and/or wireless communication medium.

In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like. In embodiments, the invention is programmed in either Java or .Net.

In embodiments, member devices 102-104 may be further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In embodiments, network 105 may be configured to couple one computing device to another computing device to enable them to communicate. In embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information may travel between client devices 102-104, and servers 106 and 107.

Figure 2:
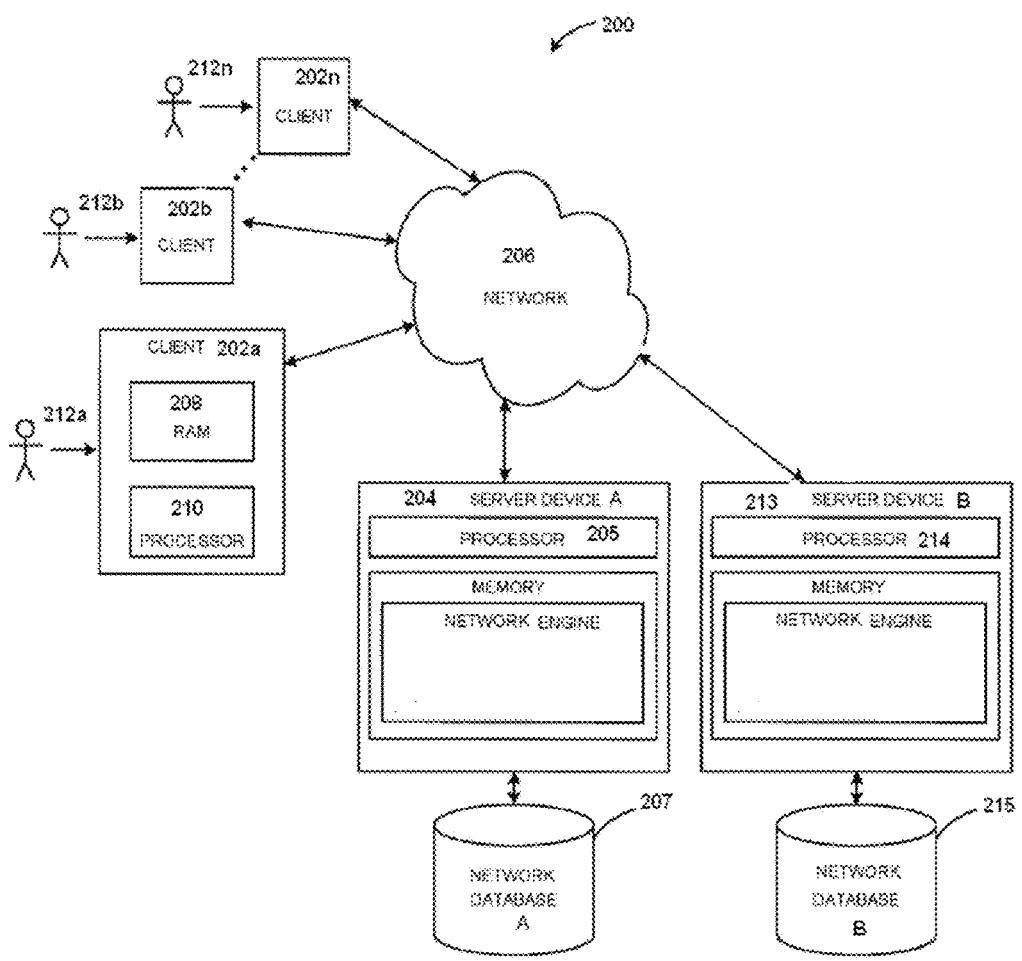

FIG. 2 shows another exemplary embodiment of the computer and network architecture that supports some embodiments of the inventive system. In some embodiments, the member devices 202a, 202b thru 202n shown (e.g., the sources and the channels connected with the exchange), each comprises a computer-readable medium, such as a random access memory (RAM) 208 coupled to a processor 210 or FLASH memory. The processor 210 may execute computer-executable program instructions stored in memory 208. Such processors comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of client 202a, with computer-readable instructions. Other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, in some embodiments, of the instant invention, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

In some embodiments, member devices 202a-n may also comprise a number of external or internal devices such as a mouse, a CD-ROM, DVD, a keyboard, a display, or other input or output devices. Examples of client devices 202a-n may be personal computers, digital assistants, personal digital assistants, cellular phones, mobile phones, smart phones, pagers, digital tablets, laptop computers, Internet appliances, and other processor-based devices. In general, a client device 202a are be any type of processor-based platform that is connected to a network 206 and that interacts with one or more application programs. Client devices 202a-n may operate on any operating system capable of supporting a browser or browser-enabled application, such as Microsoft™, Windows™, or Linux. The client devices 202a-n shown may include, for example, personal computers executing a browser application program such as Microsoft Corporation's Internet Explorer™, Apple Computer, Inc.'s Safari™, Mozilla Firefox, and Opera. Through the client devices 202a-n, users 212a-n communicate over the network 206 with each other and with other systems and devices coupled to the network 206. As shown in FIG. 2, server devices 204 and 213 may be also coupled to the network 206.

Figure 3:
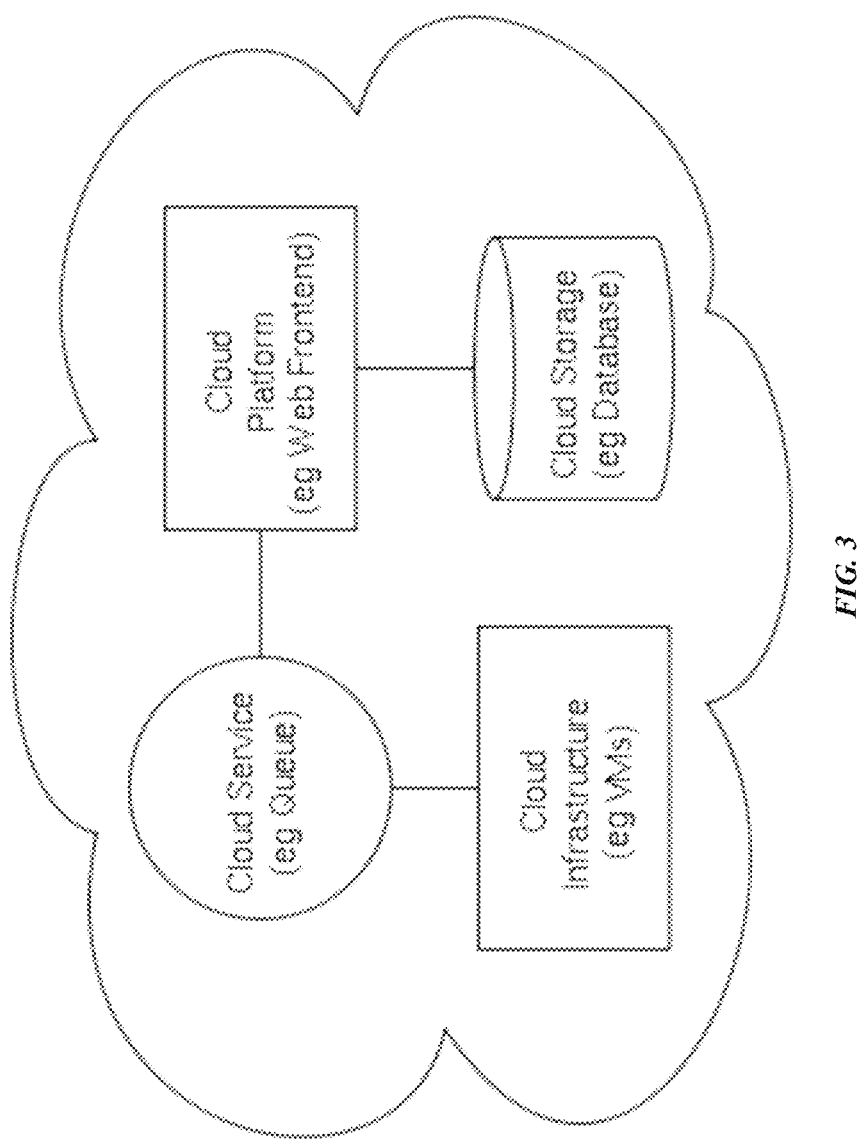
Figure 4:
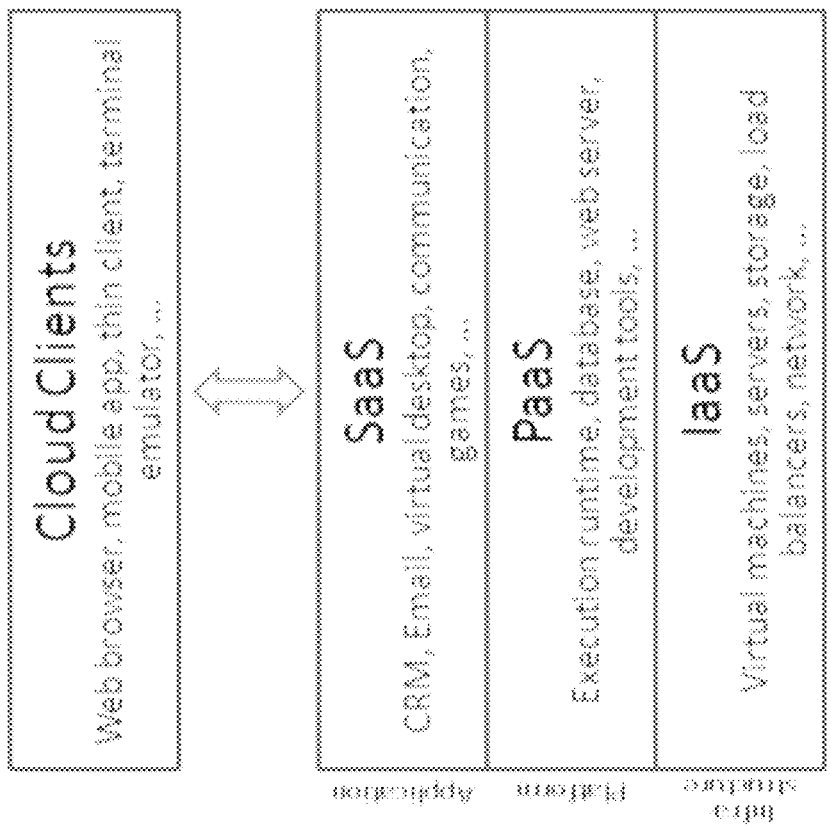

For purposes of the instant description, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). In some embodiments, the instant invention offers/manages the cloud computing/architecture as, but not limiting to: infrastructure a service (IaaS), platform as a service (PaaS), and software as a service (SaaS). FIGS. 3 and 4 illustrate schematics of exemplary implementations of the cloud computing/architecture.

In some embodiments, the term "mobile electronic device" may refer to any portable electronic device that may or may not be enabled with location tracking functionality. For example, a mobile electronic device can include, but is not limited to, a mobile phone, tablet, Personal Digital Assistant (PDA), Blackberry™, Pager, Smartphone, or any other reasonable mobile electronic device. For ease, at times the above variations are not listed or are only partially listed, this is in no way meant to be a limitation.

In some embodiments, the terms "proximity detection," "locating," "location data," "location information," and "location tracking" as used herein may refer to any form of location tracking technology or locating method that can be used to provide a location of a mobile electronic device, such as, but not limited to, at least one of location information manually input by a user, such as, but not limited to entering the city, town, municipality, zip code, area code, cross streets, or by any other reasonable entry to determine a geographical area; Global Positions Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed, this is in no way meant to be a limitation.

In some embodiments, the instant invention can utilize near-field wireless communication (NFC) that can represent a short-range wireless communications technology in which NFC-enabled devices are "swiped," "bumped," "tap" or otherwise moved in close proximity to communicate. In some embodiments, NFC could include a set of short-range wireless technologies, typically requiring a distance of 10 cm or less.

In some embodiments, NFC may operate at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, NFC peer-to-peer communication can be conducted when a plurality of NFC-enable devices are within close proximity of each other.

In some embodiments, the instant invention provides for a computer-implemented method that at least includes the following steps: administering, by a first specifically programmed computer system of a communications exchange, an electronic delivery of at least one first electronic distribution from at least one first sender to at least one first recipient, by allowing: i) the at least one first sender to send the at least one first electronic distribution to the at least one first recipient, and ii) the at least one first recipient to set a plurality of recipient attributes and a plurality of recipient rules to identify, for the at least one first sender, the communications exchange, or both, at least one of the following: 1) what electronic distributions the at least one first recipient desires to receive, 2) where the at least one first recipient desires to receive electronic distributions addressed to the at least one first recipient, and 3) how the at least one first recipient desires to receive the electronic distributions addressed to the at least one first recipient; where the mediating, by the first specifically programmed computer system of the communications exchange, includes: receiving, by the first specifically programmed computer system of a communications exchange, from at least one first source of a plurality of sources, at least one first electronic distribution of the at least one first sender, where the at least one first electronic distribution is addressed to the at least one first recipient; where the at least one first source is a second computer-programmed electronic system that the at least one first sender utilizes; where the receiving of the at least one first electronic distribution is in accordance with at least one first electronic exchange protocol defined between the first specifically programmed computer system of the communications exchange and the second computer-programmed electronic system of the at least one first source; receiving, by the first specifically programmed computer system, from the at least one first sender, a plurality of sender attributes of the at least one first sender and a plurality of sender rules of the at least one first sender that define how electronic distributions of the at least one first sender to be delivered; receiving, by the first specifically programmed computer system of the communications exchange, the plurality of recipient attributes of the at least one first recipient and the plurality of recipient rules of the at least one first recipient; matching, by the first specifically programmed computer system of the communications exchange, the at least one first electronic distribution of at least one first sender to the at least one first recipient; transmitting, by the first specifically programmed computer system of the communications exchange, the at least one first electronic distribution of at least one first sender to at least one first channel associated with the at least one first recipient; where the matching and transmitting are based at least in part on: i) the plurality of sender attributes of the at least one first sender, ii) the plurality of sender rules of the at least one first sender, iii) the plurality of recipient attributes of the at least one first recipient, and iv) the plurality of recipient rules of the at least one first recipient; where the first channel is a third computer-programmed electronic system that the at least one first recipient utilizes to receive the electronic distributions addressed to the at least one first recipient; where the second computer-programmed electronic system of the at least one first source and the third computer-programmed electronic system of the at least one first channel are independent from each other; and where the transmitting is in accordance with at least one second electronic exchange protocol defined between the first specifically programmed computer system of the communications exchange and the third computer-programmed electronic system of the at least one channel.

In some embodiments, the at least one first electronic exchange protocol is based at least in part on: i) a plurality of source attributes of the at least one first source, ii) a plurality of source rules of the at least one first source, iii) a plurality of exchange attributes of the communications exchange, and iv) a plurality of exchange rules of the communications exchange.

In some embodiments, the at least one second electronic exchange protocol is based at least in part on: i) a plurality of channel attributes of the at least one first channel, ii) a plurality of channel rules of the at least one first channel, iii) a plurality of exchange attributes of the communications exchange, and iv) a plurality of exchange rules of the communications exchange.

In some embodiments, the at least one first channel is selected from the group of: i) secure electronic messaging system, ii) a website, iii) a device application, and iv) a digital mail system.

In some embodiments, the at least one first source is selected from the group of: i) secure electronic messaging system, ii) a website, iii) a device application, and iv) a digital mail system.

In some embodiments, the at least one first recipient is selected from the group of: i) an individual, ii) a retail investor, iii) an institutional investor, and iv) an entity that is not a person.

In some embodiments, the plurality of recipient attributes are selected from the group of: i) a piece of information to be used to verify identity of the at least first recipient, where the piece of information includes at least one of the following: 1) first, last and middle name, 2) an organization name, 3) a physical address, 4) a date of birth, 5) a government identifier, 6) a telephone number, and 7) a bio-metrics credential, ii) an email address, and iii) an identity credential.

In some embodiments, the plurality of recipient rules are selected from the group of: i) at least one legal consent rule regarding obtaining a legal consent to deliver regulatory information, ii) at least one first channel rule set by sender, iii) at least one second channel rule regarding document type, and iv) at least one third channel rule regarding delivery time, where the plurality of recipient rules are set to be permanent or to be followed during or for a pre-determined time period.

In some embodiments, the at least one first sender is selected from the group of: i) an individual, ii) an individual investor, iii) a financial organization, and iv) an entity that is not a person.

In some embodiments, the plurality of sender attributes are selected from the group of: i) a piece of information to be used to verify identity of the at least first recipient, where the piece of information includes at least one of the following: 1) first, last and middle name, 2) an organization name, 3) a physical address, 4) a date of birth, 5) a government identifier, 6) a telephone number of the at least one first recipient, 7) a telephone number of the organization, and 8) a bio-metrics credential, ii) identifying information of the at least one first sender to be displayed by the at least one first channel to the at least one recipient, iii) at least one first sender identifier that is utilized to identify the at least one first sender to at least one of: the first specifically programmed computer system of the communications exchange, the at least one first source, the plural of the sources, the at least one first channel, the plurality of channels, and the at least one first recipient.

In some embodiments, the plurality of sender rules is selected from the group of: i) at least one first sender rule identifying at least one channel supported by the at least one sender, ii) at least one second sender rule identifying at least one characteristic to be used to identify the at least one channel supported by the at least one sender, iii) at least one fourth sender rule identifying a legal consent language to be accepted by to the at least one first recipient, iv) at least one fourth sender rule identifying how identity of the at least one first recipient to be verified, and v) at least one fourth sender rule identifying how the plurality of recipient attributes of the at least one first recipient to be validated.

In some embodiments, the at least one first electronic distribution of the at least one first sender is selected from the group of: i) at least one advertising, ii) at least one catalogue, iii) at least one financial record statement, iv) at least one trade confirmation, v) at least one regulatory communication, vi) a public company's proxy, voting instruction form, or both, vii) a mutual fund's proxy, voting instruction form, or both, viii) at least one initial public offering prospectus, ix) at least one mutual fund prospectus, x) at least one legal notice, xi) at least one corporate notice, xii) at least one government non-regulatory communication, xiii) at least one certificate, xiv) at least one trading instruction, xv) at least one check, xvi) at least one data element, xvii) at least one image, xviii) at least one video, xix) at least one audio recording, xx) at least one interactive application, xxi) at least one letter or notice, xxii) at least one standardized formatted message, xxiii) at least one non-standard formatted message whose formatted has been mutually agreed upon the at least one first sender and the at least one first recipient); and xxiv) at least one link to at least one of: the at least one electronic document, the at least one data element, the at least one image, the at least one video, the at least one audio recording, and the at least one interactive application.

In some embodiments, the method further includes at least one of the following: i) sharing, by the first specifically programmed computer system of a communications exchange, the plurality of recipient attributes and the plurality of the recipients rules with the at least one first sender, at least one other sender of the plurality of senders, or the plurality of senders, ii) applying, by the first specifically programmed computer system of a communications exchange, the plurality of recipient attributes and the plurality of the recipients rules to deliver the at least one first electronic distribution received from the at least one first sender, without prior sharing the plurality of recipient attributes and the plurality of the recipients rules with the at least one first sender and the at least one first source, and iii) applying, by the first specifically programmed computer system of a communications exchange, the plurality of recipient attributes and the plurality of the recipients rules to deliver the at least one first electronic distribution received from the at least one first sender.

In some embodiments, the first specifically programmed computer system of the communications exchange receives the plurality of recipient attributes and the plurality of recipient rules from at least one of the following: i) the at least one first sender, at least one other sender of the plurality of senders, or the plurality of senders, and ii) the at least one first channel, at least one other channel of the plurality of channels, or the plurality of channels.

In some embodiments, the plurality of sender attributes and the plurality of sender rules are set by at least one of the following: i) the at least one first sender, and ii) the at least one first source, at least one other source of the plurality of sources, or the plurality of sources.

In some embodiments, the method further includes: notifying, by the first specifically programmed computer system of the communications exchange, the at least one first sender that the delivery of the at least one first electronic distribution has failed.

In some embodiments, the method further includes: identifying, by the first specifically programmed computer system of the communications exchange, at least one relationship between the at least one first recipient and the at least one first sender, the plurality of senders, or both, based at least in part on the plurality of recipient attributes set by the at least one first recipient.

In some embodiments, the identifying the at least one relationship is further based on historical information about at least one of: i) the at least one first recipient, ii) the at least one first sender, and iii) the plurality of senders.

In some embodiments, the method further includes: converting, by the first specifically programmed computer system of the communications exchange, the at least one first electronic distribution from a first format of the at least one first source to a second format of the at least one first channel.

In some embodiments, the method further includes: generating, by the first specifically programmed computer system of the communications exchange, for the at least one first sender, at least one first report, identifying at least one of the following: i) delivery information about successful delivery, failed delivery, or both, ii) viewing information regarding whether has been viewed or not, and iii) usage information regarding a utilization of the at least one first electronic distribution within the at least one first channel, the plurality f channels, or both.

In some embodiments, the method further includes: generating, by the first specifically programmed computer system of the communications exchange, at least one usage report for at least one of: i) the at least one first source, ii) the at least one first sender, iii) the at least one first recipient, and iv) the at least one first channel.

In some embodiments, the plurality of channel rules includes at least two of the following: i) at least one first channel rule identifying at least one source supported by the at least one first channel, ii) at least one second channel rule identifying at least one sender supported by the at least one first channel, iii) at least one third channel rule identifying at least one distribution type supported by the at least one first channel, iv) at least one fourth channel rule identifying at least one distribution format supported by the at least one first channel, v) at least one fifth channel rule identifying at least one unassociated attribute supported by the at least one first channel, and vi) at least one sixth channel rule identifying at least one unassociated rule supported by the at least one first channel.

In some embodiments, the instant invention provides for a specifically programmed communications exchange, including at least the following components: at least one first specialized computer machine, including: a non-transient memory having at least one region for storing particular computer executable program code; and at least one processor for executing the particular program code stored in the memory, where the particular program code is configured so that the at least one first specialize computer machine is configured to at least perform the following operations: administering an electronic delivery of at least one first electronic distribution from at least one first sender to at least one first recipient, by allowing: i) the at least one first sender to send the at least one first electronic distribution to the at least one first recipient without knowing an electronic address associated with the at least one first recipient, and ii) the at least one first recipient to set a plurality of recipient attributes and a plurality of recipient rules to identify, for the at least one first sender, the communications exchange, or both, at least one of the following: 1) what electronic distributions the at least one first recipient desires to receive, 2) where the at least one first recipient desires to receive electronic distributions addressed to the at least one first recipient, and 3) how the at least one first recipient desires to receive the electronic distributions addressed to the at least one first recipient; where the mediating includes: receiving, from at least one first source of a plurality of sources, at least one first electronic distribution of the at least one first sender, where the at least one first electronic distribution is addressed to the at least one first recipient; where the at least one first source is a second computer-programmed electronic system that the at least one first sender utilizes; where the receiving of the at least one first electronic distribution is in accordance with at least one first electronic exchange protocol defined between the communications exchange and the second computer-programmed electronic system of the at least one first source; receiving, from the at least one first sender, a plurality of sender attributes of the at least one first sender and a plurality of sender rules of the at least one first sender that define how electronic distributions of the at least one first sender to be delivered; receiving, the plurality of recipient attributes of the at least one first recipient and the plurality of recipient rules of the at least one first recipient; matching the at least one first electronic distribution of at least one first sender to the at least one first recipient; transmitting the at least one first electronic distribution of at least one first sender to at least one first channel associated with the at least one first recipient; where the matching and transmitting are based at least in part on: i) the plurality of sender attributes of the at least one first sender, ii) the plurality of sender rules of the at least one first sender, iii) the plurality of recipient attributes of the at least one first recipient, and iv) the plurality of recipient rules of the at least one first recipient; where the first channel is a third computer-programmed electronic system that the at least one first recipient utilizes to receive the electronic distributions addressed to the at least one first recipient; where the second computer-programmed electronic system of the at least one first source and the third computer-programmed electronic system of the at least one first channel are independent from each other; and where the transmitting is in accordance with at least one second electronic exchange protocol defined between the first specifically programmed computer system of the communications exchange and the third computer-programmed electronic system of the at least one channel.

While a number of embodiments of the present invention have been described, it is understood that these embodiments are illustrative only, and not restrictive, and that many modifications may become apparent to those of ordinary skill in the art. Further, any steps described herein may be carried out in any desired order (and any steps may be added and/or deleted).

What is claimed is:

1. A computer-implemented method, comprising:
  administering, by a first specifically programed computer system of a communications exchange, electronic delivery of a plurality of electronic distributions from a plurality of senders to a plurality of recipients, by allowing:
    i) each sender to define to a particular source of a plurality of sources how particular electronic distributions of such sender to be delivered from the particular source of the plurality of sources, based on:
      1) a plurality of sender attributes of such sender, and
      2) a plurality of sender rules of such sender, and
    ii) each recipient to define, for a particular sender, the communications exchange, or both, how such recipient receives particular electronic distributions directed to such recipient, based on:
1) a plurality of recipient attributes of such recipient and
2) a plurality of recipient rules of such recipient,
wherein the plurality of recipient attributes of such recipient and the plurality of recipient rules of such recipient identify at least the following:
1) a particular type of electronic distributions that such recipient desires to receive, and
2) a particular channel from a plurality of channels that such recipient desires to be utilized to deliver the particular type of electronic distributions addressed to such recipient receiving, by the first specifically programmed computer system of the communications exchange, from at least one first source of a plurality of sources, at least one first electronic distribution of at least one first sender, wherein the at least one first electronic distribution is addressed to at least one first recipient;

wherein the at least one first source is a second computer-programmed electronic system that the at least one first sender utilizes;

wherein the receiving of the at least one first electronic distribution is in accordance with at least one first electronic exchange protocol defined between the first specifically programed computer system of the communications exchange and the second computer-programmed electronic system of the at least one first source;

wherein the at least one first electronic exchange protocol is based at least in part on:
i) a plurality of source attributes of the at least one first source,
ii) a plurality of source rules of the at least one first source,
iii) a plurality of exchange attributes of the communications exchange, and
iv) a plurality of exchange rules of the communications exchange;

receiving, by the first specifically programmed computer system of the communications exchange, from the at least one first source, a first plurality of sender attributes of the at least one first sender and a first plurality of sender rules of the at least one first sender that define how particular electronic distributions of the at least one first sender to be delivered;

receiving, by the first specifically programmed computer system of the communications exchange, from the plurality of channels, the plurality of recipient attributes of a plurality of recipients and the plurality of recipient rules of the plurality of recipients;

wherein each channel of the plurality of channels is a computer-programmed electronic system that communicates with the first specifically programed computer system of the communications exchange in accordance with at least one second electronic exchange protocol, being based at least in part on:
i) a plurality of channel attributes of such channel,
ii) a plurality of channel rules of such channel,
iii) the plurality of exchange attributes of the communications exchange, and
iv) the plurality of exchange rules of the communications exchange;

matching, by the first specifically programmed computer system of the communications exchange, the at least one first electronic distribution of the at least one first sender to:
1) at least one first recipient of the plurality of recipients and
2) at least one first channel from the plurality of channels to deliver the at least one first electronic distribution of the at least one first sender;

wherein the matching is based on:
i) the first plurality of sender attributes of the at least one first sender,
ii) the first plurality of sender rules of the at least one first sender,
iii) a first plurality of recipient attributes of the at least one first recipient,
iv) a first plurality of recipient rules of the at least one first recipient,
v) the plurality of channel attributes of the plurality of channels, and
vi) the plurality of channel rules of the plurality of channels;

transmitting, by the first specifically programmed computer system of the communications exchange, the at least one first electronic distribution of the at least one first sender to the at least one first channel associated with the at least one first recipient;

wherein the transmitting is based at least in part on the at least one second electronic exchange protocol of the at least one first channel;

wherein the at least one first channel is a third computer-programmed electronic system;

wherein the second computer-programmed electronic system of the at least one first source and the third computer-programmed electronic system of the at least one first channel are independent from: 1) each other and 2) the first specifically programed computer system of the communications exchange.

2. The method of claim 1, wherein the at least one first channel is selected from the group of:
i) secure electronic messaging system,
ii) a website, and
iii) a digital mail system.

3. The method of claim 1, wherein the at least one first source is selected from the group of:
secure electronic messaging system,
i) a website,
ii) a website, and
iii) a digital mail system.

4. The method of claim 1, wherein the at least one first recipient is selected from the group of:
i) an individual,
ii) an retail investor,
iii) an institutional investor, and
iv) an entity that is not a person.

5. The method of claim 1, wherein the plurality of recipient attributes are selected from the group of:
i) a piece of information to be used to verify identity of the at least first recipient, wherein the piece of information comprises at least one of the following:
1) first, last and middle name,
2) an organization name,
3) a physical address,
4) a date of birth,
5) a government identifier,
6) a telephone number, and
7) a bio-metrics credential,
ii) an email address, and
iii) an identity credential.

6. The method of claim 1, wherein the plurality of recipient rules are selected from the group of:

i) at least one legal consent rule regarding obtaining a legal consent to deliver regulatory information,
ii) at least one first channel rule set by sender,
iii) at least one second channel rule regarding document type, and
iv) at least one third channel rule regarding delivery time,
wherein the plurality of recipient rules are set to be permanent or to be followed during or for a pre-determined time period.

7. The method of claim 1, wherein the at least one first sender is selected from the group of:
i) an individual,
ii) an individual investor,
iii) a financial organization, and
iv) an entity that is not a person.

8. The method of claim 1, wherein the plurality of sender attributes are selected from the group of:
i) a piece of information to be used to verify identity of the at least first recipient, wherein the piece of information comprises at least one of the following:
  1) first, last and middle name,
  2) an organization name,
  3) a physical address,
  4) a date of birth,
  5) a government identifier,
  6) a telephone number of the at least one first recipient,
  7) a telephone number of the organization, and
  8) a bio-metrics credential,
ii) identifying information of the at least one first sender to be displayed by the at least one first channel to the at least one recipient,
iii) at least one first sender identifier that is utilized to identify the at least one first sender to at least one of: the first specifically programed computer system of the communications exchange, the at least one first source, the plural of the sources, the at least one first channel, the plurality of channels, and the at least one first recipient.

9. The method of claim 1, wherein the plurality of sender rules are selected from the group of:
i) at least one first sender rule identifying at least one channel supported by the at least one sender,
ii) at least one second sender rule identifying at least one characteristic to be used to identify the at least one channel supported by the at least one sender,
iii) at least one fourth sender rule identifying a legal consent language to be accepted by to the at least one first recipient,
iv) at least one fourth sender rule identifying how identity of the at least one first recipient to be verified, and
v) at least one fourth sender rule identifying how the plurality of recipient attributes of the at least one first recipient to be validated.

10. The method of claim 1, wherein the at least one first electronic distribution of the at least one first sender is selected from the group of:
i) at least one advertising,
ii) at least one catalogue,
iii) at least one financial record statement,
iv) at least one trade confirmation,
v) at least one regulatory communication,
vi) a public company's proxy, voting instruction form, or both,
vii) a mutual fund's proxy, voting instruction form, or both,
viii) at least one initial public offering prospectus,
ix) at least one mutual fund prospectus,
x) at least one legal notice,
xi) at least one corporate notice,
xii) at least one government non-regulatory communication,
xiii) at least one certificate,
xiv) at least one trading instruction,
xv) at least one check,
xvi) at least one data element,
xvii) at least one image,
xviii) at least one video,
xix) at least one audio recording,
xx) at least one interactive application,
xxi) at least one letter or notice,
xxii) at least one standardized formatted message,
xxiii) at least one non-standard formatted message whose formatted has been mutually agreed upon the at least one first sender and the at least one first recipient); and
xxiv) at least one link to at least one of: the at least one electronic document, the at least one data element, the at least one image, the at least one video, the at least one audio recording, and the at least one interactive application.

11. The method of claim 1, wherein the method further comprises at least one of the following:
i) sharing, by the first specifically programed computer system of the communications exchange, the plurality of recipient attributes and the plurality of the recipients rules with the at least one first sender, at least one other sender of the plurality of senders, or the plurality of senders,
ii) applying, by the first specifically programed computer system of the communications exchange, the plurality of recipient attributes and the plurality of the recipients rules to deliver the at least one first electronic distribution received from the at least one first sender, without prior sharing the plurality of recipient attributes and the plurality of the recipients rules with the at least one first sender and the at least one first source, and
iii) applying, by the first specifically programed computer system of the communications exchange, the plurality of recipient attributes and the plurality of the recipients rules to deliver the at least one first electronic distribution received from the at least one first sender.

12. The method of claim 1, wherein the first specifically programed computer system of the communications exchange receives the plurality of recipient attributes and the plurality of recipient rules from at least one of the following:
i) the at least one first sender, at least one other sender of the plurality of senders, or the plurality of senders, and
ii) the at least one first channel, at least one other channel of the plurality of channels, or the plurality of channels.

13. The method of claim 1, wherein the plurality of sender attributes and the plurality of sender rules are set by at least one of the following:
i) the at least one first sender, and
ii) the at least one first source, at least one other source of the plurality of sources, or the plurality of sources.

14. The method of claim 1, wherein the method further comprises:
notifying, by the first specifically programed computer system of the communications exchange, the at least one first sender that the delivery of the at least one first electronic distribution has failed.

15. The method of claim 1, wherein the method further comprises:
identifying, by the first specifically programed computer system of the communications exchange, at least one relationship between the at least one first recipient and the at least one first sender, the plurality of senders, or both, based at least in part on the plurality of recipient attributes set by the at least one first recipient.

16. The method of claim 15, wherein the identifying the at least one relationship is further based on historical information about at least one of:
   i) the at least one first recipient,
   ii) the at least one first sender, and
   iii) the plurality of senders.

17. The method of claim 1, wherein the method further comprises:
   converting, by the first specifically programed computer system of the communications exchange, the at least one first electronic distribution from a first format of the at least one first source to a second format of the at least one first channel.

18. The method of claim 1, wherein the method further comprises:
   generating, by the first specifically programed computer system of the communications exchange, for the at least one first sender, at least one first report, identifying at least one of the following:
   i) delivery information about successful delivery, failed delivery, or both,
   ii) viewing information regarding whether has been viewed or not, and
   iii) usage information regarding a utilization of the at least one first electronic distribution within the at least one first channel, the plurality f channels, or both.

19. The method of claim 1, wherein the method further comprises:
   generating, by the first specifically programed computer system of the communications exchange, at least one usage report for at least one of:
   i) the at least one first source,
   ii) the at least one first sender,
   iii) the at least one first recipient, and
   iv) the at least one first channel.

20. The method of claim 1, wherein the plurality of channel rules comprises at least two of the following:
   i) at least one first channel rule identifying at least one source supported by the at least one first channel,
   ii) at least one second channel rule identifying at least one sender supported by the at least one first channel,
   iii) at least one third channel rule identifying at least one distribution type supported by the at least one first channel,
   iv) at least one fourth channel rule identifying at least one distribution format supported by the at least one first channel,
   v) at least one fifth channel rule identifying at least one unassociated attribute supported by the at least one first channel, and
   vi) at least one sixth channel rule identifying at least one unassociated rule supported by the at least one first channel.

21. A specifically programmed communications exchange, comprising:
   at least one first specialized computer machine, comprising:
   a non-transient memory having at least one region for storing particular computer executable program code; and
   at least one processor for executing the particular program code stored in the memory, wherein the particular program code is configured so that the at least one first specialized computer machine is configured to at least perform the following operations:
   administering electronic delivery of a plurality of electronic distributions from a plurality of senders to a plurality of recipients, by allowing:
   i) each sender to define to a particular source of a plurality of sources how particular electronic distributions of such sender to be delivered from the particular source of the plurality of sources, based on:
      1) a plurality of sender attributes of such sender, and
      2) a plurality of sender rules of such sender, and
   ii) each recipient to define, for a particular sender, the communications exchange, or both, how such recipient receives particular electronic distributions directed to such recipient, based on:
      1) a plurality of recipient attributes of such recipient and
      2) a plurality of recipient rules of such recipient,
      wherein the plurality of recipient attributes of such recipient and the plurality of recipient rules of such recipient identify at least the following:
         1) a particular type of electronic distributions that such recipient desires to receive, and
         2) a particular channel from a plurality of channels that such recipient desires to be utilized to deliver the particular type of electronic distributions addressed to such recipient
   receiving, from at least one first source of a plurality of sources, at least one first electronic distribution of at least one first sender, wherein the at least one first electronic distribution is addressed to at least one first recipient;
   wherein the at least one first source is a second computer-programmed electronic system that the at least one first sender utilizes;
   wherein the receiving of the at least one first electronic distribution is in accordance with at least one first electronic exchange protocol defined between the first specifically programed computer system of the communications exchange and the second computer-programmed electronic system of the at least one first source;
   wherein the at least one first electronic exchange protocol is based at least in part on:
      i) a plurality of source attributes of the at least one first source,
      ii) a plurality of source rules of the at least one first source,
      iii) a plurality of exchange attributes of the communications exchange, and
      iv) a plurality of exchange rules of the communications exchange;
   receiving, from the at least one first source, a first plurality of sender attributes of the at least one first sender and a first plurality of sender rules of the at least one first sender that define how particular electronic distributions of the at least one first sender to be delivered;
   receiving, from the plurality of channels, the plurality of recipient attributes of a plurality of recipients and the plurality of recipient rules of the plurality of recipients;
   wherein each channel of the plurality of channels is a computer-programmed electronic system that communicates with the first specifically programed computer system of the communications exchange in accordance with at least one second electronic exchange protocol, being based at least in part on:
   i) a plurality of channel attributes of such channel,
   ii) a plurality of channel rules of such channel,
   iii) the plurality of exchange attributes of the communications exchange, and iv) the plurality of exchange rules of the communications exchange;

matching the at least one first electronic distribution of the at least one first sender to:
1) at least one first recipient of the plurality of recipients and
2) at least one first channel from the plurality of channels to deliver the at least one first electronic distribution of the at least one first sender;

wherein the matching is based on:
i) the first plurality of sender attributes of the at least one first sender,
ii) the first plurality of sender rules of the at least one first sender,
iii) a first plurality of recipient attributes of the at least one first recipient,
iv) a first plurality of recipient rules of the at least one first recipient,
v) the plurality of channel attributes of the plurality of channels, and
vi) the plurality of channel rules of the plurality of channels;

transmitting the at least one first electronic distribution of the at least one first sender to the at least one first channel associated with the at least one first recipient;

wherein the transmitting is based at least in part on the at least one second electronic exchange protocol of the at least one first channel;

wherein the at least one first channel is a third computer-programmed electronic system;

wherein the second computer-programmed electronic system of the at least one first source and the third computer-programmed electronic system of the at least one first channel are independent from: 1) each other and 2) the first specifically programed computer system of the communications exchange.

\* \* \* \* \*